United States Patent
Zhu et al.

(10) Patent No.: US 12,294,934 B2
(45) Date of Patent: May 6, 2025

(54) METHOD AND APPARATUS FOR ACCESS OR RAT RESTRICTION

(71) Applicant: Telefonaktiebolaget LM Ericsson (publ), Stockholm (SE)

(72) Inventors: Jinyin Zhu, Shanghai (CN); Xiaoming Li, Shanghai (CN); Jesús Ángel de Gregorio Rodríguez, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 28 days.

(21) Appl. No.: 17/762,499

(22) PCT Filed: Sep. 24, 2020

(86) PCT No.: PCT/EP2020/076816
§ 371 (c)(1),
(2) Date: Mar. 22, 2022

(87) PCT Pub. No.: WO2021/058697
PCT Pub. Date: Apr. 1, 2021

(65) Prior Publication Data
US 2022/0338099 A1     Oct. 20, 2022

(30) Foreign Application Priority Data

Sep. 27, 2019  (WO) ................ PCT/CN2019/108589

(51) Int. Cl.
*H04W 48/04*     (2009.01)
*H04W 8/04*     (2009.01)
(Continued)

(52) U.S. Cl.
CPC ............. *H04W 48/04* (2013.01); *H04W 8/04* (2013.01); *H04W 48/16* (2013.01); *H04W 60/04* (2013.01); *H04W 60/06* (2013.01)

(58) Field of Classification Search
CPC ....... H04W 48/04; H04W 8/04; H04W 48/16; H04W 60/04; H04W 60/06
See application file for complete search history.

(56) References Cited

U.S. PATENT DOCUMENTS

| | | | |
|---|---|---|---|
| 2018/0054796 A1 | 2/2018 | Edge | |
| 2018/0103426 A1 | 4/2018 | Nacer et al. | |

(Continued)

FOREIGN PATENT DOCUMENTS

| | | | |
|---|---|---|---|
| CN | 101511076 A | 8/2009 | |
| CN | 102845085 A | 12/2012 | |

(Continued)

OTHER PUBLICATIONS

Unknown, Author, "Reply LS on Differentiation of LTE-M (eMTC) traffic from other LTE data traffic", 3GPP TSG-RAN WG3#100, R3-182550, Busan, South Korea, May 21-25, 2018, pp. 1-2.

(Continued)

*Primary Examiner* — Won Tae C Kim
(74) *Attorney, Agent, or Firm* — Murphy, Bilak & Homiller, PLLC

(57) ABSTRACT

Embodiments of the present disclosure provide method and apparatus for access or RAT restriction. A method at a first access management entity of a network comprises determining that a user equipment (UE) is using LTE-M radio access technology (RAT). The method further comprises obtaining access restriction or RAT restriction data associated with the UE, wherein the access restriction or RAT restriction data indicates that LTE-M RAT type is restricted. The method further comprises determining whether the UE using LTE-M is allowed to attach or register to the network based on the obtained access restriction or RAT restriction data associated with the UE.

19 Claims, 14 Drawing Sheets

(51) Int. Cl.
*H04W 48/16* (2009.01)
*H04W 60/04* (2009.01)
*H04W 60/06* (2009.01)

(56) References Cited

U.S. PATENT DOCUMENTS

| | | | |
|---|---|---|---|
| 2019/0182897 A1* | 6/2019 | Jain | H04W 4/80 |
| 2020/0059888 A1* | 2/2020 | Cui | H04L 5/0048 |
| 2021/0014685 A1* | 1/2021 | Betti | H04W 12/08 |
| 2021/0204180 A1 | 7/2021 | Chun | |
| 2021/0409942 A1* | 12/2021 | De Kievit | H04W 12/02 |
| 2022/0201638 A1* | 6/2022 | Arrobo Vidal | H04W 48/08 |

FOREIGN PATENT DOCUMENTS

| | | |
|---|---|---|
| CN | 108347744 A | 7/2018 |
| WO | 2018172408 A1 | 9/2018 |
| WO | 2019074325 A1 | 4/2019 |

OTHER PUBLICATIONS

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 15)", 3GPP TS 29.274 V15.7.1, Mar. 2019, pp. 1-395.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274 V16.0.0, Jun. 2019, pp. 1-396.

3GPP, "3rd Generation Partnership Project; Technical Specification Group Core Network and Terminals; 5G System; Access and Mobility Management Services; Stage 3 (Release 15)", 3GPP TS 29.518 V15.3.0, Mar. 2019, pp. 1-194.

3GPP, "3rd Generation Partnership Project; Technical Specification Group Core Network and Terminals; 5G System; Common Data Types for Service Based Interfaces; Stage 3 (Release 15)", 3GPP TS 29.571 V15.3.0, Mar. 2019, pp. 1-73.

3GPP, "3rd Generation Partnership Project; Technical Specification Group Core Network and Terminals; 5G System; Common Data Types for Service Based Interfaces; Stage 3 (Release 16)", 3GPP TS 29.571 V16.0.0, Jun. 2019, pp. 1-79.

3GPP, "3rd Generation Partnership Project; Technical Specification Group Core Network and Terminals; 5G System; Session Management Services; Stage 3 (Release 16)", 3GPP TS 29.502 V16.0.0, Jun. 2019, pp. 1-164.

3GPP, "3rd Generation Partnership Project; Technical Specification Group Core Network and Terminals; 5G System; Unified Data Management Services; Stage 3 (Release 15)", 3GPP TS 29.503 V15.3.0, Mar. 2019, pp. 1-187.

3GPP, "3rd Generation Partnership Project; Technical Specification Group Core Network and Terminals; 5G System; Unified Data Management Services; Stage 3 (Release 16)", 3GPP TS 29.503 V16.0.0, Jun. 2019, pp. 1-205.

3GPP, "3rd Generation Partnership Project; Technical Specification Group Core Network and Terminals; Evolved Packet System (EPS); Mobility Management Entity (MME) and Serving GPRS Support Node (SGSN) related Interfaces based on Diameter protocol (Release 15)", 3GPP TS 29.272 V15.8.0, Jun. 2019, pp. 1-179.

3GPP, "3rd Generation Partnership Project; Technical Specification Group Core Network and Terminals; Evolved Packet System (EPS); Mobility Management Entity (MME) and Serving GPRS Support Node (SGSN) related Interfaces based on Diameter protocol (Release 15)", 3GPP TS 29.272 V15.7.0, Mar. 2019, pp. 1-179.

3GPP, "3rd Generation Partnership Project; Technical Specification Group Services and System Aspects; Architecture enhancements for non-3GPP accesses (Release 16)", 3GPP TS 23.402 V16.0.0, Jun. 2019, pp. 1-314.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.3.0, Jun. 2019, pp. 1-423.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.4.0, Sep. 2019, pp. 1-424.

3GPP, "3rd Generation Partnership Project; Technical Specification Group Services and System Aspects; Procedures for the 5G System (5GS); Stage 2 (Release 16)", 3GPP TS 23.502 V16.5.1, Aug. 2020, pp. 1-594.

3GPP, "3rd Generation Partnership Project; Technical Specification Group Services and System Aspects; Procedures for the 5G System; Stage 2 (Release 16)", 3GPP TS 23.502 V16.1.1, Jun. 2019, pp. 1-495.

3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.

3GPP, "3rd Generation Partnership Project; Technical Specification Group Services and System Aspects; System architecture for the 5G System (5GS); Stage 2 (Release 16)", 3GPP TS 23.501 V16.6.0, Sep. 2020, pp. 1-447.

3GPP, "3rd Generation Partnership Project; Technical Specification Group Services and System Aspects; System Architecture for the 5G System; Stage 2 (Release 16)", 3GPP TS 23.501 V16.1.0, Jun. 2019, pp. 1-368.

QUALCOMM Incorporated, "LTE-M identification in 5GC", SA WG2 Meeting #133, S2-1905276, (was S2-190xxxx), Reno, NV, USA, May 13-17, 2019, pp. 1-2.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.9.0, Sep. 2019, 1-412.

Unknown, Author, "Draft Report of SA WG2 meetings #126", SA WG2 Meeting #126 Draft Report, Montreal, Canada, Version 0.0.5, Feb. 26-Mar. 2, 2018, 1-595.

* cited by examiner

METHOD AND APPARATUS FOR ACCESS OR RAT RESTRICTION

TECHNICAL FIELD

The non-limiting and exemplary embodiments of the present disclosure generally relate to the technical field of communications, and specifically to methods and apparatuses for access or radio access technology (RAT) restriction.

BACKGROUND

This section introduces aspects that may facilitate a better understanding of the disclosure. Accordingly, the statements of this section are to be read in this light and are not to be understood as admissions about what is in the prior art or what is not in the prior art.

A wireless network may define one or more radio access technology (RAT) types. For example, 3rd Generation Partnership Project (3GPP) TS 23.401 V16.3.0, the disclosure of which is incorporated by reference herein in its entirety, has defined the RAT types as below:

Cellular IoT (Internet of Things): Cellular network supporting low complexity and low throughput devices for a network of Things. Cellular IoT supports IP (Internet protocol), Ethernet and Non-IP traffic.

Narrowband-IoT (NB-IoT): a 3GPP Radio Access Technology that forms part of Cellular IoT. It allows access to network services via E-UTRA (Evolved Universal Terrestrial Radio Access) with a channel bandwidth limited to 180 kHz (corresponding to one PRB (physical resource block)). Unless otherwise indicated in a clause, Narrowband-IoT is a subset of E-UTRAN (Evolved Universal Terrestrial Radio Access Network).

LTE-M: a 3GPP RAT type Identifier used in the Core Network only, which is a sub-type E-UTRAN RAT type, and defined to identify in the Core Network the E-UTRAN when used by a UE (user equipment) indicating Category M in its UE radio capability.

WB-E-UTRAN: in the RAN (Radio Access Network), WB-E-UTRAN is the part of E-UTRAN that excludes NB-IoT. In the Core Network, the WB-E-UTRAN also excludes LTE-M.

LTE-M RAT type may be used by the Core Network (CN) to distinguish a Category M device from a normal MBB (Mobile Broadband) device which uses the WB-E-UTRAN RAT type and thereby is used for charging and policy control purpose.

3GPP TS29.272 V15.8.0, the disclosure of which is incorporated by reference herein in its entirety, has defined the Access-Restriction-Data as below:

The Access-Restriction-Data AVP (Attribute Value Pair) is of type Unsigned32 and it shall contain a bit mask where each bit when set to 1 indicates a restriction. The meaning of the bits is the following:

| Bit | Description |
|---|---|
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | Enhanced Coverage Not Allowed |
| 8 | NR as Secondary RAT in E-UTRAN Not Allowed |
| 9 | Unlicensed Spectrum as Secondary RAT Not Allowed |
| 10 | NR in 5GS Not Allowed |

NOTE:
Bits not defined in this table shall be cleared by the HSS and discarded by the receiving MME/SGSN.

3GPP TS29.503 V16.0.0, the disclosure of which is incorporated by reference herein in its entirety, has defined the RAT type related restriction data in AccessAndMobilitySubscriptionData as below:

| Attribute name | Data type | P | Cardinality | Description |
|---|---|---|---|---|
| supportedFeatures | SupportedFeatures | O | 0 . . . 1 | See clause 6.1.8 |
| gpsis | array(Gpsi) | O | 0 . . . N | List of Generic Public Subscription Identifier; see 3GPPTS 29.571 |
| internalGroupIds | array(GroupId) | O | 1 . . . N | List of internal group identifier; see 3GPP TS 23.501 clause 5.9.7 |
| subscribedUeAmbr | AmbrRm | O | 0 . . . 1 | |
| nssai | Nssai | O | 0 . . . 1 | Network Slice Selection Assistance Information |
| ratRestrictions | array (RatType) | O | 0 . . . N | List of RAT Types that are restricted; see 3GPP TS 29.571 |
| forbiddenAreas | array (Area) | O | 0 . . . N | List of forbidden areas |
| serviceAreaRestriction | ServiceAreaRestriction | O | 0 . . . 1 | Subscribed Service Area Restriction |
| coreNetworkTypeRestrictions | array(CoreNetworkType) | O | 0 . . . N | List of Core Network Types that are restricted |
| rfspIndex | RfspIndexRm | O | 0 . . . 1 | Index to RAT/Frequency Selection Priority; |
| subsRegTimer | DurationSecRm | O | 0 . . . 1 | Subscribed periodic registration timer; see 3GPP TS 29.571 |
| ueUsageType | UeUsageType | O | 0 . . . 1 | |
| mpsPriority | MpsPriorityIndicator | O | 0 . . . 1 | |
| mcsPriority | McsPriorityIndicator | O | 0 . . . 1 | |
| activeTime | DurationSecRm | O | 0 . . . 1 | subscribed active time for PSM UEs |
| dlPacketCount | DlPacketCount | O | 0 . . . 1 | DL Buffering Suggested Packet Count indicates whether extended buffering of downlink packets for High Latency Communication is requested. |
| sorInfo | SorInfo | O | 0 . . . 1 | On Nudm, this IE shall be present if the UDM shall send the information for Steering of Roaming during registration or the subscription data update to the UE. The UDM may detect the need to send sorInfo by retrieving context information from the UDR. |
| upuInfo | UpuInfo | O | 0 . . . 1 | This IE shall be present if the UDM shall send the information for UE Parameters Update after the UE has been successfully authenticated and registered to the 5G system. |

-continued

| Attribute name | Data type | P | Cardinality | Description |
| --- | --- | --- | --- | --- |
| micoAllowed | MicoAllowed | O | 0 . . . 1 | Indicates whether the UE subscription allows MICO mode. |
| sharedAmDataIds | array(SharedDataId) | O | 0 . . . N | Identifier of shared Access And Mobility Subscription data |
| odbPacketServices | OdbPacketServices | O | 0 . . . 1 | Operator Determined Barring for Packet Oriented Services |
| subscribedDnnList | array (Dnn) | O | 0 . . . N | List of the subscribed DNNs for the UE. Used to determine the list of LADN available to the UE as defined in clause 5.6.5 of TS 23.501 |
| serviceGapTime | DurationSec | O | 0 . . . 1 | Used to set the Service Gap timer for Service Gap Control (see TS 23.501 clause 5.26.16 and TS 23.502 clause 4.2.2.22). |
| traceData | TraceData | O | 0 . . . 1 | Trace requirements about the UE, only sent to AMF in the HPLMN or one of its equivalent PLMN(s) |

NOTE:
AccessAndMobilitySubscriptionData can be UE-individual data or shared data.
UE-individual data take precedence over shared data.
E.g.: When an attribute of type array is present but empty within UE-Individual data and present (with any cardinality) in shared data, the empty array takes precedence. Similarly, when a nullable attribute is present with value null within the individual data and present (with any value) in shared data, the null value takes precedence (i.e. for the concerned UE the attribute is considered absent).

3GPP TS29.571 V16.0.0, the disclosure of which is incorporated by reference herein in its entirety, has defined the RAT type as below:

| Enumeration value | Description |
| --- | --- |
| "NR" | New Radio |
| "EUTRA" | (WB) Evolved Universal Terrestrial Radio Access |
| "WLAN" | Wireless LAN |
| "VIRTUAL" | Virtual (see NOTE) |
| "NBIOT" | NB IoT |

NOTE:
Virtual shall be used if the N3IWF does not know the access technology used for an untrusted non-3GPP access.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

With the introduction of LTE-M RAT type, the charging and policy control for the CAT-M devices can be distinguished from the normal MBB devices using WB-E-UTRAN RAT type. An operator may have different billing policy for CAT-M subscription and MBB subscription.

However, there are some issues for access or RAT restriction in the wireless network. For example, although the LTE-M RAT type can be used to identify a CAT-M device and thereby to enforce specific policy and charging control for the CAT-M device, in some cases, an operator may want to directly restrict the usage of WB-E-UTRAN for the CAT-M subscription or CAT-M for the WB-E-UTRAN subscription. For example, the operator may provide a data plan per month with a fixed low price for the CAT-M subscription assuming that there will not be big consumption of data using CAT-M device.

According to 3GPP TS29.272 V15.8.0, 3GPP TS29.503 V16.0.0 and 3GPP TS29.571 V16.0.0, there is no way to do access or RAT restriction for LTE-M and WB-E-UTRAN RAT type separately, thus there is no mechanism to limit the CAT-M subscription to be associated with the CAT-M device only, for example, restricting the usage of WB-E-UTRAN but allow the usage of LTE-M or the usage of LTE-M but allow the usage of WB-E-UTRAN. Therefore, for example, when a USIM (Universal Subscriber Identity Module) card associated with the CAT-M subscription is inserted into a normal MBB device, the user cannot be billed properly or when a USIM card associated with the WB-E-UTRAN subscription is inserted into a CAT-M device, the user cannot be billed properly.

To overcome or mitigate at least one above mentioned problems or other problems or provide a useful solution, an improved access restriction or RAT restriction solution may be desirable.

In a first aspect of the disclosure, there is provided a method at a first access management entity of a network. The method comprises determining that a user equipment (UE) is using LTE-M radio access technology (RAT). The method further comprises obtaining access restriction or RAT restriction data associated with the UE, wherein the access restriction or RAT restriction data indicates that LTE-M RAT type is restricted. The method further comprises determining whether the UE using LTE-M is allowed to attach or register to the network based on the obtained access restriction or RAT restriction data associated with the UE.

In an embodiment, when the LTE-M RAT type is indicated as restriction, the UE using LTE-M may be not allowed to attach or register to the network.

In an embodiment, when the UE is not allowed to attach or register to the network, the method may further comprise sending a deregistration request or a detach request to the UE when UE has registered or attached to the network; or sending a registration reject or an attach reject or a TAU reject to the UE during a registration procedure or an attach procedure or a TAU procedure.

In an embodiment, the access restriction or RAT restriction data may be obtained from at least one of a subscription data entity of the network; a second access management entity of the network; or a second access management entity of another network.

In an embodiment, the first access management entity is a mobility management entity (MME), the method may further comprise receiving an attach request or a tracking area update (TAU) request from a UE. The method may further comprise sending an update location request to a home subscriber server (HSS). The method may further comprise receiving an update location answer from the HSS. The update location answer may include the access restriction or RAT restriction data associated with the UE.

In an embodiment, the update location request may include information indicating that the MME supports restriction related to the LTE-M RAT type and the update location answer may include information indicating that the HSS supports restriction related to the LTE-M RAT type.

In an embodiment, the first access management entity is a mobility management entity (MME), the method may further comprise receiving an insert subscriber data request from a home subscriber server (HSS). The method may further comprise sending an insert subscriber data answer to the HSS. The insert subscriber data request may include the access restriction or RAT restriction data associated with the UE.

In an embodiment, the insert subscriber data request may include information indicating that the HSS supports restriction related to the LTE-M RAT type and the insert subscriber data answer may include information indicating that the MME supports restriction related to the LTE-M RAT type.

In an embodiment, the first access management entity is an access and mobility function (AMF), the method may further comprise receiving a registration request from the UE. The method may further comprise sending a Nudm_SDM_get request to a unified data management (UDM). The method may further comprise receiving a Nudm_SDM_get response including the access restriction or RAT restriction data associated with the UE from the UDM.

In an embodiment, the first access management entity is an access and mobility function (AMF), the method may further comprise receiving an Nudm_SDM_Notification including the access restriction or RAT restriction data associated with the UE from a unified data management (UDM).

In an embodiment, the first access management entity is a new mobility management entity (MME), the method may further comprise receiving a tracking area update (TAU) request from the UE. The method may further comprise sending a context request for getting the UE' context to an old MME or an old access and mobility function (AMF). The method may further comprise receiving a context response including the access restriction or RAT restriction data associated with the UE from the old MME or the old AMF.

In an embodiment, the first access management entity is a new access and mobility function (AMF), the method may further comprise receiving a registration request from the UE. The method may further comprise sending an Namf_Communication_UEContextTransfer request for getting the UE' context to an old AMF. The method may further comprise receiving an Namf_Communication_UEContextTransfer response including the access restriction or RAT restriction data associated with the UE from the old AMF.

In an embodiment, the first access management entity is a new access and mobility function (AMF), the method may further comprise receiving a registration request from the UE. The method may further comprise sending a context request for getting the UE' context to an old MME. The method may further comprise receiving a context response including the access restriction or RAT restriction data associated with the UE from the old MME.

In an embodiment, the access restriction or RAT restriction data may further indicate that a WB-E-UTRAN RAT type excludes the LTE-M RAT is restricted.

In an embodiment, the access restriction or RAT restriction data indicating that LTE-M RAT type is restricted may be a bit and the access restriction or RAT restriction data indicating that a WB-E-UTRAN RAT type excludes the LTE-M RAT is restricted may be a bit.

In a second aspect of the disclosure, there is provided a method at a subscription data entity. The method comprises obtaining access restriction or radio access technology (RAT) restriction data associated with a user equipment (UE). The access restriction or RAT restriction data indicates that LTE-M is restricted for the UE. The method further comprises sending the access restriction or RAT restriction data associated with the UE to a first access management entity of a network.

In an embodiment, the first access management entity is a mobility management entity (MME) and the subscription data entity is a home subscriber server (HSS), the method may further comprise receiving an update location request from the MME. The method may further comprise sending an update location answer including the access restriction or RAT restriction data associated with the UE to the MME.

In an embodiment, the first access management entity is a mobility management entity (MME) and the subscription data entity is a home subscriber server (HSS), the method further comprises determining a change of the restriction related to the LTE-M RAT type. The method may further comprise sending an insert subscriber data request including the access restriction or RAT restriction data associated with the UE to the MME.

In an embodiment, the first access management entity is an access and mobility function (AMF) and the subscription data entity is a unified data management (UDM), the method may further comprise receiving a Nudm_SDM_get request from AMF. The method may further comprise sending a Nudm_SDM_get response including the access restriction or RAT restriction data associated with the UE to the AMF.

In an embodiment, the first access management entity is an access and mobility function (AMF) and the subscription data entity is a unified data management (UDM), the method may further comprise determining a change of the restriction related to the LTE-M RAT type. The method may further comprise sending an Nudm_SDM_Notification including the access restriction or RAT restriction data associated with the UE to the AMF.

In a third aspect of the disclosure, there is provided a method at a second access management entity. The method comprises receiving a request for getting a context of a user equipment (UE) from a first access management entity of a network. The method further comprises sending a response including access restriction or radio access technology (RAT) restriction data associated with the UE to the first access management entity. The access restriction or RAT restriction data indicates that LTE-M RAT type is restricted.

In an embodiment, the first access management entity is a new mobility management entity (MME) and the second access management entity is an old MME or an old access and mobility function (AMF), the request may be a context request and the response may be a context response.

In an embodiment, the first access management entity is a new access and mobility function (AMF) and the second access management entity is an old access and mobility function (AMF), the request may be an Namf_Communication_UEContextTransfer request and the response may be an Namf_Communication_UEContextTransfer response.

In an embodiment, the first access management entity is a new access and mobility function (AMF) and the second access management entity is an old mobility management entity (MME), the request may be a context request and the response may be a context response.

In another aspect of the disclosure, there is provided an apparatus at a first access management entity of a network. The apparatus comprises a processor; and a memory coupled to the processor, said memory containing instructions executable by said processor, whereby said apparatus is operative to determine that a user equipment (UE) is using LTE-M radio access technology (RAT). Said apparatus is further operative to obtain access restriction or RAT restriction data associated with the UE, wherein the access restriction or RAT restriction data indicates that LTE-M RAT type is restricted. Said apparatus is further operative to determine whether the UE using LTE-M is allowed to attach or register to the network based on the obtained access restriction or RAT restriction data associated with the UE.

In another aspect of the disclosure, there is provided an apparatus at a subscription data storage entity. The apparatus comprises a processor; and a memory coupled to the processor, said memory containing instructions executable by said processor, whereby said apparatus is operative to obtain access restriction or radio access technology (RAT) restriction data associated with a user equipment (UE), wherein the access restriction or RAT restriction data indicates that LTE-M is restricted for the UE. Said apparatus is further operative to send the access restriction or RAT restriction data associated with the UE to a first access management entity of a network.

In another aspect of the disclosure, there is provided an apparatus at a second access management entity. The apparatus comprises a processor; and a memory coupled to the processor, said memory containing instructions executable by said processor, whereby said apparatus is operative to receive a request for getting a context of a user equipment (UE) from a first access management entity of a network. Said apparatus is further operative to send a response including access restriction or radio access technology (RAT) restriction data associated with the UE to the first access management entity. The access restriction or RAT restriction data indicates that LTE-M RAT type is restricted.

In another aspect of the disclosure, there is provided a first access management entity of a network. The network node comprises a determining module, an obtaining module and a deciding module. The determining module may be configured to determine that a user equipment (UE) is using LTE-M radio access technology (RAT). The obtaining module may be configured to obtain access restriction or RAT restriction data associated with the UE, wherein the access restriction or RAT restriction data indicates that LTE-M RAT type is restricted. The determining module may be configured to determine whether the UE using LTE-M is allowed to attach or register to the network based on the obtained access restriction or RAT restriction data associated with the UE.

In another aspect of the disclosure, there is provided a subscription data storage entity. The subscription data storage entity comprises an obtaining module and a sending module. The obtaining module may be configured to obtain access restriction or radio access technology (RAT) restriction data associated with a user equipment (UE). The access restriction or RAT restriction data indicates that LTE-M is restricted for the UE. The sending module may be configured to send the access restriction or RAT restriction data associated with the UE to a first access management entity of a network.

In another aspect of the disclosure, there is provided a second access management entity. The second access management entity comprises a receiving module and a sending module. The receiving module may be configured to receive a request for getting a context of a user equipment (UE) from a first access management entity of a network. The sending module may be configured to send a response including access restriction or radio access technology (RAT) restriction data associated with the UE to the first access management entity. The access restriction or RAT restriction data indicates that LTE-M RAT type is restricted.

In another aspect of the disclosure, there is provided a computer program product comprising instructions which, when executed on at least one processor, cause the at least one processor to carry out the method according to the first aspect of the disclosure.

In another aspect of the disclosure, there is provided a computer program product comprising instructions which, when executed on at least one processor, cause the at least one processor to carry out the method according to the second aspect of the disclosure.

In another aspect of the disclosure, there is provided a computer program product comprising instructions which, when executed on at least one processor, cause the at least one processor to carry out the method according to the third aspect of the disclosure.

In another aspect of the disclosure, there is provided a computer-readable storage medium storing instructions which, when executed on at least one processor, cause the at least one processor to carry out the method according to the first aspect of the disclosure.

In another aspect of the disclosure, there is provided a computer-readable storage medium storing instructions which, when executed on at least one processor, cause the at least one processor to carry out the method according to the second aspect of the disclosure.

In another aspect of the disclosure, there is provided a computer-readable storage medium storing instructions which, when executed on at least one processor, cause the at least one processor to carry out the method according to the third aspect of the disclosure.

Embodiments herein afford many advantages, of which a non-exhaustive list of examples follows. Some embodiments herein may provide the flexibility for operator to define its access restriction rule more accurately, especially for LTE-M, which can enable the operator to exactly control the usage of LTE-M and to provide a simple billing policy (e.g., a data plan per month with fixed price) for CAT-M subscription without complicating the charging logic. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
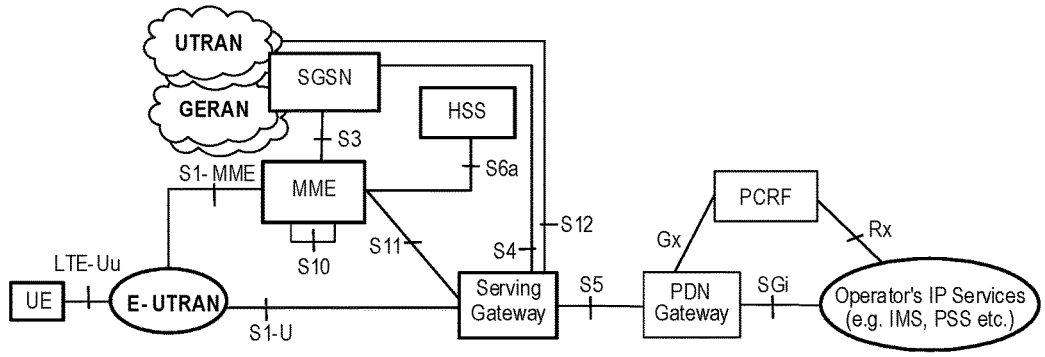
FIG. 1 schematically shows a high level architecture in a 4G network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network entity" or "network node" as used herein refers to a network device (physical or virtual) in a communication network. In CUPS (Control User Plane Split) architecture, the network node may comprise a control plane function and a user plane function. The network device may offer numerous services to customers who are interconnected by an access network device. Each access network device is connectable to a core network device over a wired or wireless connection.

The term "network function (NF)" refers to any suitable function which can be implemented in a network node (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), (R)AN ((radio) access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Although the subject matter described herein may be implemented in any appropriate type of system using any suitable components, the embodiments disclosed herein are described in relation to a communication system complied with the exemplary system architecture as illustrated in clause 4.2 of 3GPP TS23.501 V16.1.0 and clause 4.2 of 3GPP TS 23.401 V16.3.0, the disclosure of which is incorporated by reference herein in its entirety. For simplicity, the system architectures of FIGS. 1-2 only depict some exemplary elements of exemplary system architectures. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1 schematically shows a high level architecture in a 4G network. The functional description of the entities and the description of reference points as shown in FIG. 1 are specified in 3GPP TS 23.401 V16.3.0. FIG. 1 only depicts some exemplary elements such as universal terrestrial radio access network (UTRAN), Global System for Mobile Communications (GSM)/Enhanced Data for GSM Evolution (EDGE) Radio Access Network (GERAN), serving general packet radio service support node (SGSN), mobility management entity (MME), Policy and Charging Rules Function (PCRF), home subscriber server (HSS), UE, evolved universal terrestrial radio access network (E-UTRAN), Serving gateway (SGW), PDN gateway (PGW), etc. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

MME functions may include:
NAS (Non-access stratum) signalling;
NAS signalling security;
Inter CN (core network) node signalling for mobility between 3GPP access networks (terminating S3);
Tracking Area list management;
MME selection for handovers with MME change;
SGSN selection for handovers to 2G or 3G 3GPP access networks;
Roaming (S6a towards home HSS);
etc.

HSS may store various data. HSS may store access restriction data which may indicate the access restriction subscription information. It may include different values for HPLMN (home public land mobile network) and roaming case. According to an embodiment of the present disclosure, HSS may include access restriction or RAT restriction data associated with a UE. For example, the access restriction or RAT restriction data may include first information indicating whether a LTE-M RAT type is restricted.

Figure 2:
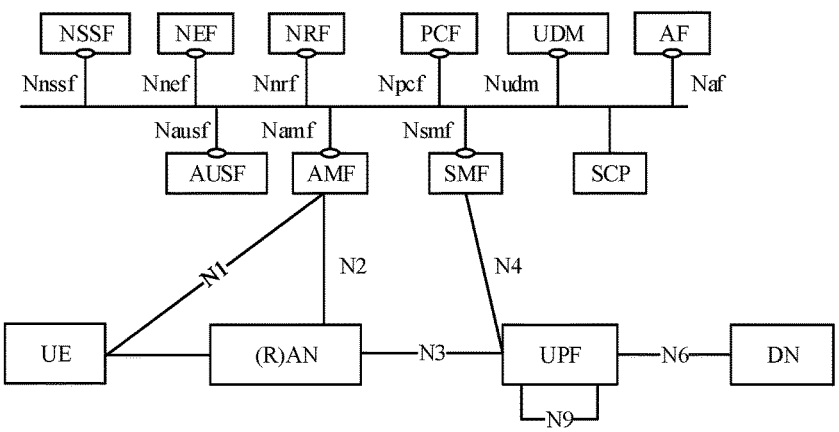
FIG. 2 schematically shows a high level architecture in a 5G network.

FIG. 2 schematically shows a high level architecture in a 5G network. The system architecture of FIG. 2 may comprise some exemplary elements such as AUSF, AMF, DN, NEF, NRF, NSSF, PCF, SMF, UDM, UPF, SCP, AF, UE, (R)AN.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, and security. These may be critical for delivering a service in the network. The AUSF, AMF, DN, NEF, NRF, NSSF, PCF, SMF, UDM, UPF, AF, UE, SCP, (R)AN may include the functionality for example as defined in clause 6.2 of 3GPP TS23.501 V16.1.0.

The AMF may include the following functionality:
Registration management.
Connection management.
Mobility Management.
Access Authentication.
Access Authorization.
etc.

The UDM may support for the following functionality:
Access authorization based on subscription data (e.g. roaming restrictions).
UE's Serving NF Registration Management (e.g. storing serving AMF for UE, storing serving SMF for UE's PDU Session).
Subscription management.
etc.

The subscription data (including authentication data) may be stored in UDR (Unified Data Repository), in which case a UDM implements the application logic and does not require an internal user data storage and then several different UDMs may serve the same user in different transactions.

Figure 3A:
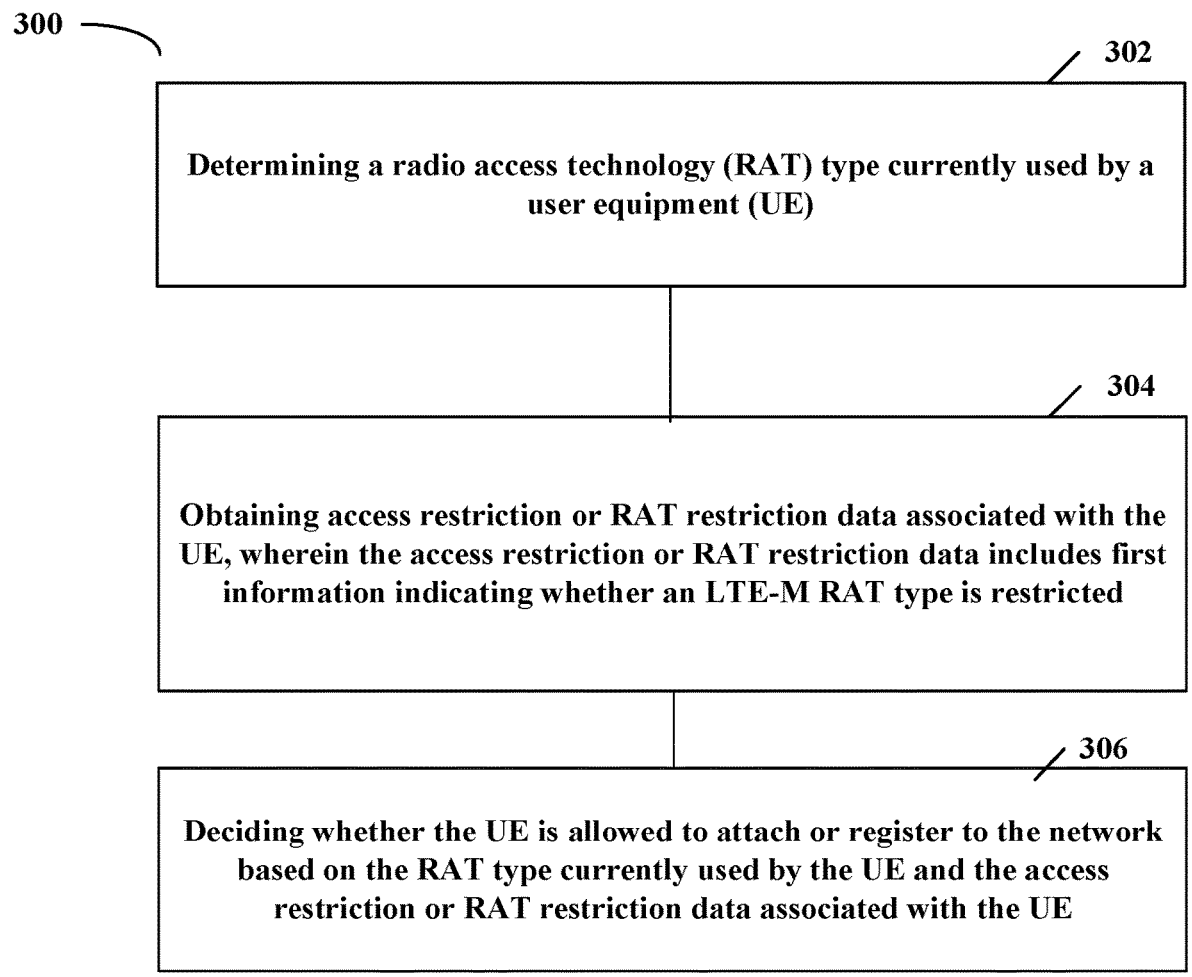
FIG. 3*a* shows a flowchart of a method according to an embodiment of the present disclosure.

FIG. 3a shows a flowchart of a method according to an embodiment of the present disclosure, which may be performed by an apparatus implemented in/at or communicatively coupled to a first access management entity of a network. As such, the apparatus may provide means or modules for accomplishing various parts of the method 300 as well as means or modules for accomplishing other processes in conjunction with other components. The first access management entity can be any suitable access management entity such as MME or AMF as shown in FIGS. 1-2. In other embodiment, the first access management entity may be any other network node or function capable of providing access management function in other wireless network. Optionally, the access management entity may provide mobility management function.

At block 302, the first access management entity determines a RAT type currently used by a UE. The first access management entity may determine the RAT type currently used by the UE in various ways. For example, the first access management entity may derive the RAT type currently used by the UE based on the UE's radio capability and/or an explicit indication from a RAN currently serving the UE and/or RAN (radio access network) identifier (ID), etc. The RAT type may be any suitable RAT type defined or supported by the network. For example, the RAT type may be similar to the RAT types as defined by various 3GPP specifications, such as LTE-M, UTRAN, GERAN, Generic Access Network (GAN), HSPA (High Speed Packet Access)-Evolution, WB-E-UTRAN, NB-IoT, NR, etc. The first access management entity may determine the RAT type currently used by the UE during various communication procedures such as during a registration procedure or an attach procedure or a tracking area update (TAU) procedure or an access restriction or RAT restriction data change notification procedure, etc.

At block 304, the first access management entity obtains access restriction or RAT restriction data associated with the UE. The first access management entity may obtain the access restriction or RAT restriction data associated with the UE in various ways. For example, when the first access management entity has stored the access restriction or RAT restriction data associated with the UE in its local storage or memory, it can obtain this data from its local storage or memory. Alternatively, the first access management entity may obtain this data from another network node which has stored this data or can retrieve this data. For example, the first access management entity may obtain the access restriction or RAT restriction data from at least one of a subscription data entity (e.g., subscription data storage entity) of the network; a second access management entity of the network; or a second access management entity of another network. The subscription data storage entity may be any suitable information storage device such as HSS or UDM, etc. The second access management entity of the network may be an old access management entity of the network which previously severed the UE. For example, in an inter-access management entity mobility procedure or a mobility registration update procedure, the first access management entity of the network may be a new access management entity of the network, and the second access management entity of the network may be an old access management entity of the network which previously severed the UE. The second access management entity of another network may be an old access management entity which previously severed the UE. For example, in an inter system mobility procedure, the first access management entity of the network may be a new access management entity of the network, and the second access management entity of the network may be an old access management entity of another network which previously severed the UE.

In an embodiment, the access restriction or RAT restriction data includes first information indicating whether an LTE-M RAT type is restricted. In an embodiment, the first information can explicitly indicate whether the LTE-M RAT type is restricted. In addition, the access restriction or RAT restriction data may further include any other access restriction or RAT restriction information. In an embodiment, the access restriction or RAT restriction data may further include second information indicating whether a WB-E-UTRAN RAT type excludes the LTE-M RAT is restricted. The first information and the second information may be expressed in various ways such as an indicator, a bit, a bit in a bitmap, etc.

At block 306, the first access management entity decides whether the UE is allowed to attach or register to the network based on the RAT type currently used by the UE and the access restriction or RAT restriction data associated with the UE. For example, when LTE-M is indicated as restriction in subscription data while LTE-M RAT type is being used by UE, the UE is not allowed to attach or register to the network. When the access restriction or RAT restriction data associated with the UE further include other access restriction or RAT restriction information, the first access management entity may perform a similar decision as the LTE-M RAT type. For example, when WB-E-UTRAN except LTE-M is indicated as restriction while WB-E-UTRAN RAT type is being used by UE, the UE is not allowed to attach or register to the network. When the UE is allowed to attach or register to the network, the first access management entity may serve the UE, such as allowing the UE to attach or register to the network or processing the message to/from the UE, etc.

Figure 3B:
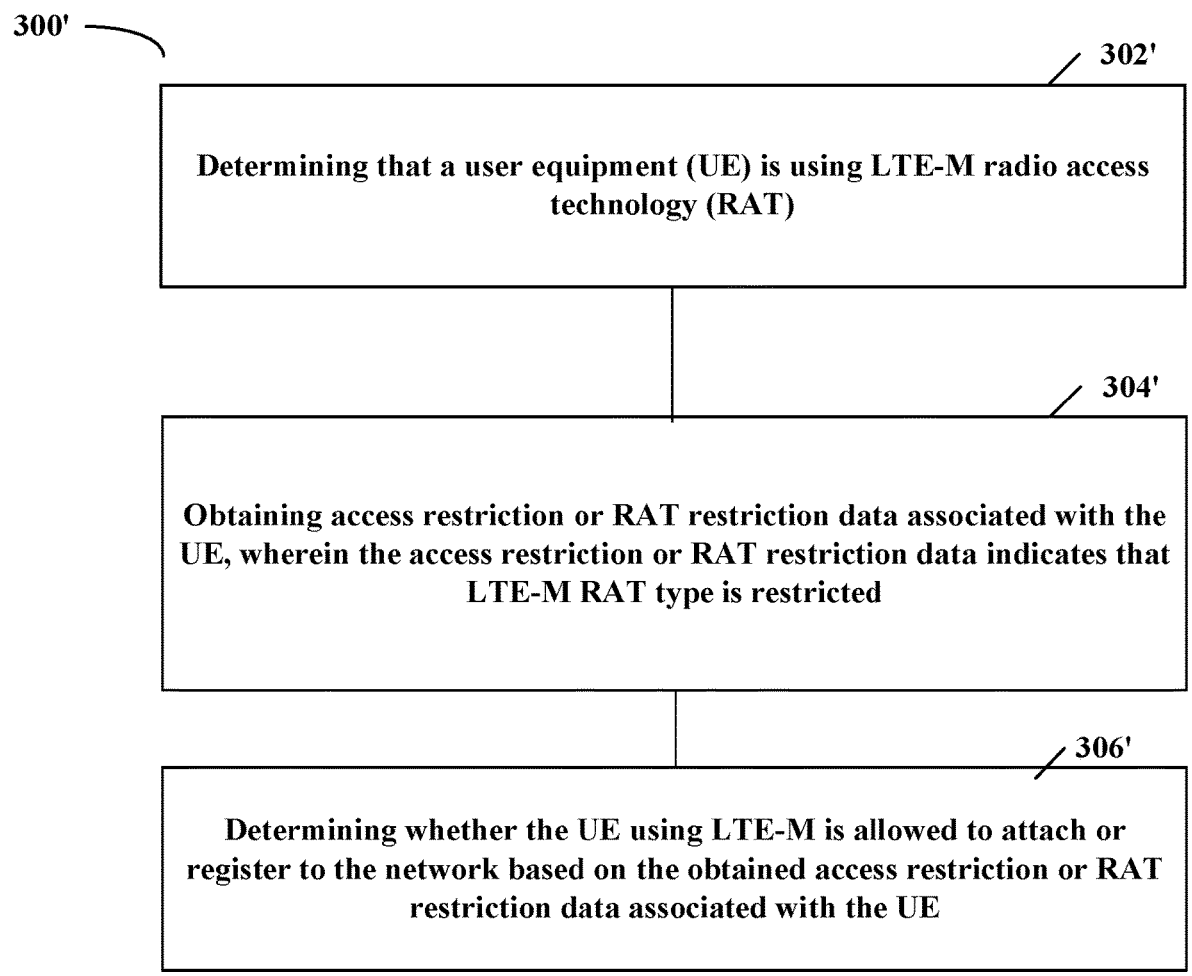
FIG. 3*b* shows a flowchart of a method according to another embodiment of the present disclosure.

FIG. 3b shows a flowchart of a method according to another embodiment of the present disclosure, which may be performed by an apparatus implemented in/at or communicatively coupled to a first access management entity of a network. As such, the apparatus may provide means or modules for accomplishing various parts of the method 300' as well as means or modules for accomplishing other processes in conjunction with other components. The first access management entity can be any suitable access management entity such as MME or AMF as shown in FIGS. 1-2. In other embodiment, the first access management entity may be any other network node or function capable of providing access management function in other wireless network. Optionally, the access management entity may provide mobility management function. For some parts which have been described in the above embodiments, the description thereof is omitted here for brevity.

At block 302', the first access management entity may determine that a user equipment (UE) is using LTE-M radio access technology (RAT).

In an embodiment, when the LTE-M RAT type is indicated as restriction, the UE using LTE-M is not allowed to attach or register to the network.

In an embodiment, the access restriction or RAT restriction data further indicates that a WB-E-UTRAN RAT type excludes the LTE-M RAT is restricted.

In an embodiment, the access restriction or RAT restriction data indicating that LTE-M RAT type is restricted is a bit and the access restriction or RAT restriction data indicating that a WB-E-UTRAN RAT type excludes the LTE-M RAT is restricted is a bit.

At block 304', the first access management entity may obtain access restriction or RAT restriction data associated with the UE, wherein the access restriction or RAT restriction data indicates that LTE-M RAT type is restricted.

At block 306', the first access management entity may determine whether the UE using LTE-M is allowed to attach or register to the network based on the obtained access restriction or RAT restriction data associated with the UE.

Comparing with the prior art such as 3GPP TS V15.8.0, 3GPP TS29.503 V16.0.0 and 3GPP TS29.571 V16.0.0, this embodiment provides a mechanism to limit the CAT-M subscription to be associated with the CAT-M device only, for example, restricting the usage of WB-E-UTRAN but allow the usage of LTE-M. Therefore, for example, when a USIM (Universal Subscriber Identity Module) card associated with the CAT-M subscription is inserted into a normal MBB device, the UE can not access or register to the network.

In an embodiment, for EPS (evolved packet system), it can extend the access restriction data as defined in 3GPP TS29.272 V15.8.0 to indicate whether LTE-M RAT type is restricted and/or whether WB-E-UTRAN RAT type except LTE-M RAT type is restricted (i.e., whether only LTE-M RAT type of WB-E-UTRAN RAT type is allowed).

In an embodiment, for EPS, it can extend the MM (Mobility Management) context (EPS Security Context and Quadruplets) as defined in 3GPP TS 29.274 V16.0.0, the disclosure of which is incorporated by reference herein in its entirety, to indicate whether LTE-M RAT type is restricted and/or whether WB-E-UTRAN RAT type except LTE-M RAT type is restricted (i.e., whether only LTE-M RAT type of WB-E-UTRAN RAT type is allowed).

In an embodiment, for 5GS, it can extend the RAT type as defined in 3GPP TS29.571 V16.0.0 to include LTE-M RAT type so that (1) when UDM sends AccessAndMobilitySubscriptionData to AMF, ratRestrictions can indicate whether LTE-M RAT type or WB-E-UTRAN RAT type except LTE-M RAT type is restricted respectively; (2) when a source AMF sends UE context to a target AMF, restrictedRatList can indicate whether LTE-M RAT type or WB-E-UTRAN RAT type except LTE-M RAT type is restricted respectively.

In an embodiment, the first access management entity such as MME or AMF may derive whether LTE-M RAT type or WB-U-TRAN RAT type is being used, e.g., according to UE radio capability information or an explicit indication from RAN, and decides whether the UE is allowed to attach or register to the network based on both the RAT type currently used by the UE and the LTE-M related restriction data received from HSS or UDM.

In an embodiment, when LTE-M RAT type is indicated as restriction in subscription data while LTE-M RAT type is being used by UE, the UE is not allowed to attach or register to the network.

In an embodiment, when WB-E-UTRAN RAT type except LTE-M RAT type is indicated as restriction while WB-E-UTRAN RAT type is being used by UE, the UE is not allowed to attach/register to network.

In an embodiment, Table 7.3.31/1 of 3GPP TS29.272 V15.8.0 may be amended as below:

| Access-Restriction-Data | |
|---|---|
| Bit | Description |
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | Enhanced Coverage Not Allowed |
| 8 | NR as Secondary RAT in E-UTRAN Not Allowed |
| 9 | Unlicensed Spectrum as Secondary RAT Not Allowed |
| 10 | NR in 5GS Not Allowed |
| 11 | LTE-M not allowed |
| 12 | WB-E-UTRAN except LTE-M Not Allowed |

NOTE:
Bits not defined in this table shall be cleared by the HSS and discarded by the receiving MME/SGSN.
NOTE:
bit 11 and 12 are only used when bit 4 is not set.

In an embodiment, Table 7.3.31/1 of 3GPP TS29.272 V15.8.0 may be amended as below:

| Access-Restriction-Data | |
|---|---|
| Bit | Description |
| 0 | UTRAN Not Allowed |
| 1 | GERAN Not Allowed |
| 2 | GAN Not Allowed |
| 3 | I-HSPA-Evolution Not Allowed |
| 4 | WB-E-UTRAN Not Allowed |
| 5 | HO-To-Non-3GPP-Access Not Allowed |
| 6 | NB-IoT Not Allowed |
| 7 | Enhanced Coverage Not Allowed |
| 8 | NR as Secondary RAT in E-UTRAN Not Allowed |
| 9 | Unlicensed Spectrum as Secondary RAT Not Allowed |
| 10 | NR in 5GS Not Allowed |
| 11 | LTE-M not allowed |

NOTE:
Bits not defined in this table shall be cleared by the HSS and discarded by the receiving MME/SGSN.

The Access-Restriction-Data AVP is of type Unsigned32 and it shall contain a bit mask where each bit when set to 1 indicates a restriction.

In an embodiment, the subscription data storage entity such as HSS and the first access management entity such as MME may negotiate the feature of support of LTE-M restriction data.

| Feature bit | Feature | M/O | Description |
|---|---|---|---|
| X | LTE-M | O | Support of LTE-M Restriction<br>This feature is applicable to the Update-Location-Request/Answer (ULR/ULA) and Insert Subscriber Data-Request/Answer (IDR/IDA) command pairs over S6a/S6d when the MME (or combined MME/SGSN) supports LTE-M Restriction, and over S6d when the SGSN supports the indication related to LTE-M Restriction (i.e., the related Access Restriction Data).<br>If the MME, SGSN, or combined MME/SGSN does not support this feature, the HSS shall not send (in ULA) or update (in IDR) subscription data related to LTE-M Restriction.<br>If the HSS does not support this feature, the MME shall ignore the bit "LTE-M not allowed" and "WB-E-UTRAN except LTE-M Not Allowed" (for example #1 only) in Access-Restriction-Data.<br>If both HSS and MME supports this feature, MME shall additionally use "LTE-M not allowed" and "WB-E-UTRAN except LTE-M Not Allowed" (for example #1 only) to decide whether LTE-M is restricted or WB-E-UTRAN except LTE-M is restricted. |

In an embodiment, for MINI context, EPS Security Context and Quadruplets as defined in 3GPP TS 29.274 V16.0.0 may be amended as below:

| Octets | Bits | | | | | | | |
|---|---|---|---|---|---|---|---|---|
| | 8 | 7 | 6 | 5 | 4 | 3 | 2 | 1 |
| 1 | Type = 107 (decimal) | | | | | | | |
| 2 to 3 | Length = n | | | | | | | |
| 4 | Spare | | | | | Instance | | |
| 5 | Security Mode | | | NHI | DRXI | $KSI_{ASME}$ | | |
| 6 | Number of Quintuplets | | | Number of Quadruplet | | | UAMBRI | OSCI |
| 7 | SAMBRI | Used NAS integrity protection algorithm | | | | Used NAS Cipher | | |
| 8 to 10 | NAS Downlink Count | | | | | | | |
| 11 to 13 | NAS Uplink Count | | | | | | | |
| 14 to 45 | $K_{ASME}$ | | | | | | | |
| 46 to g | Authentication Quadruplet [1 . . . 5] | | | | | | | |
| (g + 1) to h | Authentication Quintuplet [1 . . . 5] | | | | | | | |
| (h + 1) to (h + 2) | DRX parameter | | | | | | | |
| p to (p + 31) | NH | | | | | | | |
| p + 32 | Spare | | | | | | | NCC |
| j to (j + 3) | Uplink Subscribed UE AMBR | | | | | | | |

-continued

| Octets | Bits | | | | | | | |
|---|---|---|---|---|---|---|---|---|
| | 8 | 7 | 6 | 5 | 4 | 3 | 2 | 1 |
| (j + 4) to (j + 7) | Downlink Subscribed UE AMBR | | | | | | | |
| i to (i + 3) | Uplink Used UE AMBR | | | | | | | |
| (i + 4) to (i + 7) | Downlink Used UE AMBR | | | | | | | |
| q | Length of UE Network Capability | | | | | | | |
| (q + 1) to k | UE Network Capability | | | | | | | |
| k + 1 | Length of MS Network Capability | | | | | | | |
| (k + 2) to m | MS Network Capability | | | | | | | |
| m + 1 | Length of Mobile Equipment Identity (MEI) | | | | | | | |
| (m + 2) to r | Mobile Equipment Identity (MEI) | | | | | | | |
| r + 1 | ECNA | NBNA | HNNA | ENA | INA | GANA | GENA | UNA |
| s | NHI_old | Spare | | old $KSI_{ASME}$ | | | old NCC | |
| (s + 1) to (s + 32) | old $K_{ASME}$ | | | | | | | |
| (s + 33) to (s + 64) | old NH | | | | | | | |
| w | Length of Voice Domain Preference and UE's Usage Setting | | | | | | | |
| (w + 1) to t | Voice Domain Preference and UE's Usage Setting | | | | | | | |
| (t + 1) to (t + 2) | Length of UE Radio Capability for Paging information | | | | | | | |
| (t + 3) to u | UE Radio Capability for Paging information | | | | | | | |
| u + 1 | Length of Extended Access Restriction Data | | | | | | | |
| (u + 2) to v | Spare | | | | LTEMNA | WBENA | USSRNA | NRSRNA |
| v + 1 | Length of UE additional security capability | | | | | | | |
| (v + 2) to X | UE additional security capability | | | | | | | |
| x + 1 | Length of UE NR security capability | | | | | | | |
| (x + 2) to y | UE NR security capability | | | | | | | |
| (y + 1) to (y + 2) | Length of APN Rate Control Statuses | | | | | | | |
| (y + 3) to l | APN Rate Control Status [1 . . . z] | | | | | | | |
| l + 1 to (n + 4) | These octet(s) is/are present only if explicitly specified | | | | | | | |

Where WBENA denotes a bit when set to 1 indicates WB-E-UTRAN except LTE-M not allowed. LTEMNA denotes a bit when set to 1 denotes LTE-M not allowed.

In an embodiment, Table 5.4.3.2-1 of 3GPP TS29.571 V16.0.0 may be amended as below:

| Enumeration value | Description |
|---|---|
| "NR" | New Radio |
| "EUTRA" | (WB) Evolved Universal Terrestrial Radio Access |
| "WLAN" | Wireless LAN |
| "VIRTUAL" | Virtual (see NOTE) |
| "NBIOT" | NB IoT |
| "LTE-M" | LTE-M, for CAT-M UEs camping in E-UTRA (see 3GPP TS23.401 V16.3.0) |

NOTE:
Virtual shall be used if the N3IWF does not know the access technology used for an untrusted non-3GPP access.

Figure 4:
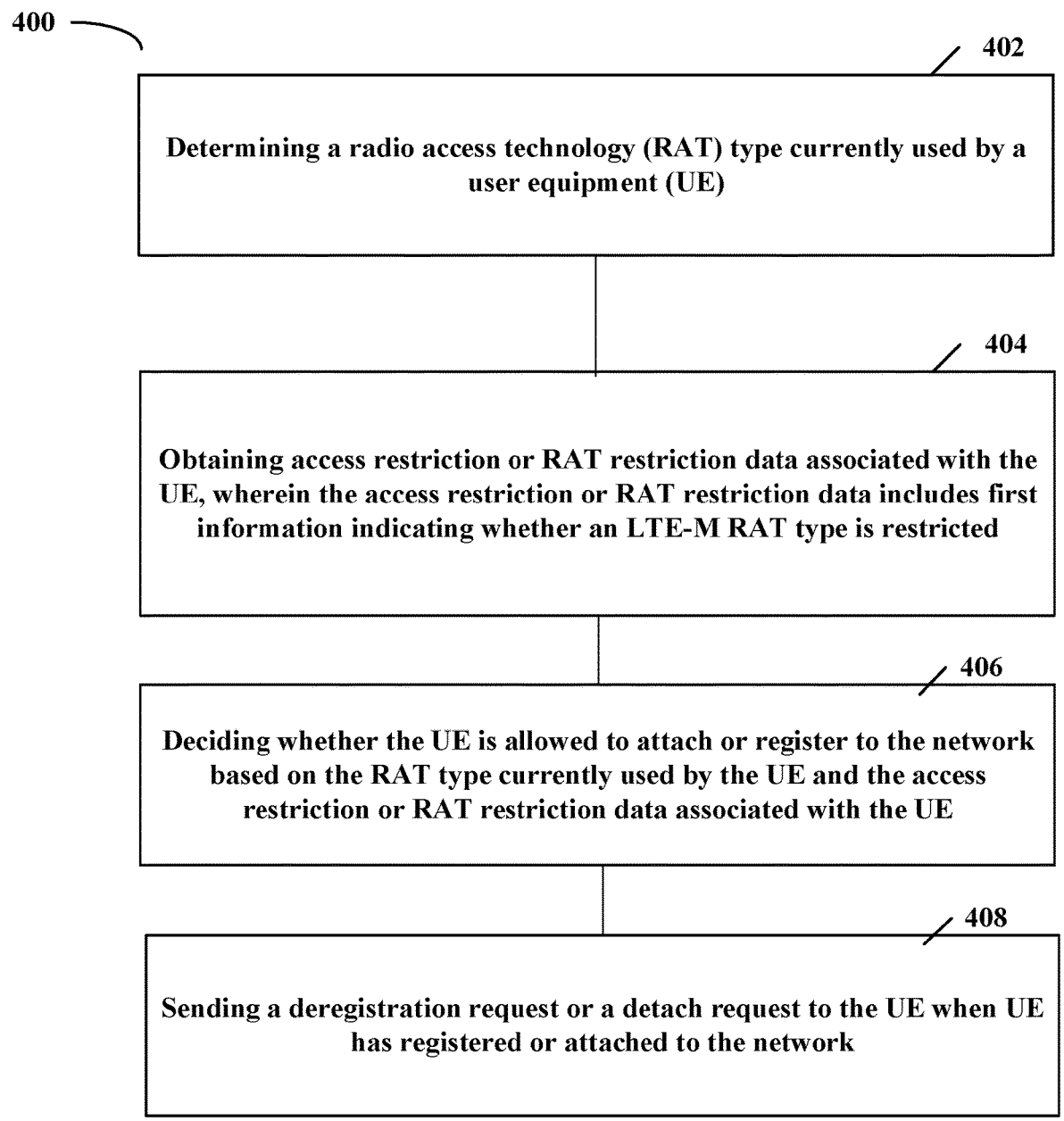
FIG. 4 shows a flowchart of a method according to another embodiment of the present disclosure.

FIG. 4 shows a flowchart of a method according to another embodiment of the present disclosure, which may be performed by an apparatus implemented in/at or communicatively coupled to a first access management entity of a network. As such, the apparatus may provide means or modules for accomplishing various parts of the method 400 as well as means or modules for accomplishing other processes in conjunction with other components. The first access management entity can be any suitable access management entity such as MME or AMF as shown in FIGS. 1-2. In other embodiment, the first access management entity may be any other network node or function capable of providing access management function in other wireless network. Optionally, the first access management entity may provide mobility management function. For some parts which have been described in the above embodiments, the description thereof is omitted here for brevity.

Blocks 402, 404 and 406 are similar to blocks 302, 304 and 306 of FIG. 3a and blocks 302', 304' and 306' of FIG. 3b, the description thereof is omitted here for brevity. In this embodiment, the first access management entity decides that the UE is not allowed to attach or register to the network at block 406.

At block 408, the first access management entity sends a deregistration request or a detach request to the UE when UE has registered or attached to the network. For example, when UE has registered or attached to the network, the first access management entity may trigger a deregistration procedure or a detach procedure by sending a deregistration or a detach request to the UE. In an embodiment, the deregistration procedure or a detach procedure may be similar to the deregistration procedure or the detach procedure as defined in various communication protocol specifications such as 3GPP TS 29.502 V16.0.0 or 3GPP TS 23.402 V16.0.0, the disclosure of which is incorporated by reference herein in its entirety.

Figure 5:
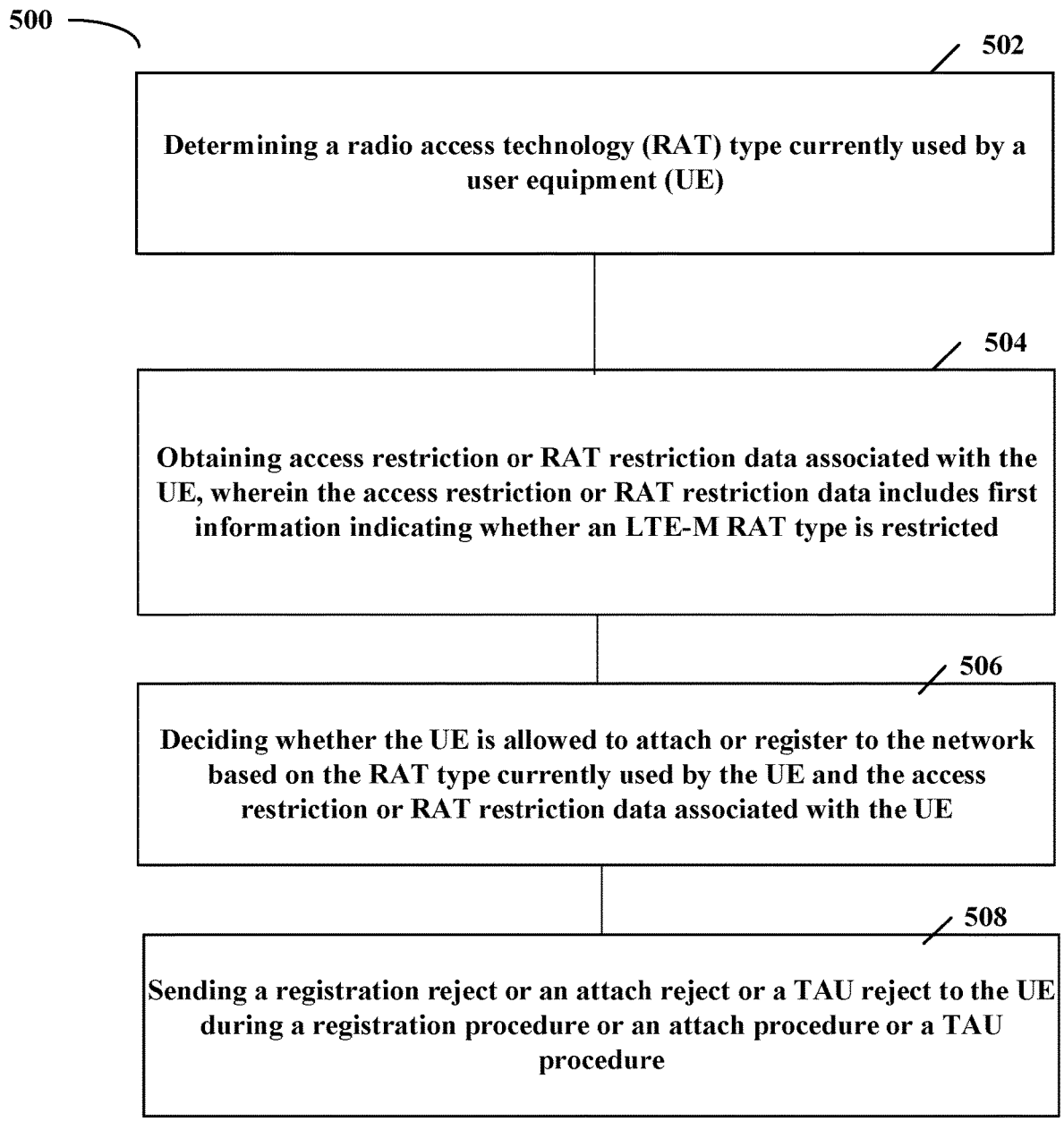
FIG. 5 shows a flowchart of a method according to another embodiment of the present disclosure.

FIG. 5 shows a flowchart of a method according to another embodiment of the present disclosure, which may be performed by an apparatus implemented in/at or communicatively coupled to a first access management entity of a network. As such, the apparatus may provide means or modules for accomplishing various parts of the method 500 as well as means or modules for accomplishing other processes in conjunction with other components. The first access management entity can be any suitable access management entity such as MME or AMF as shown in FIGS. 1-2. In other embodiment, the first access management entity may be any other network node or function capable of providing access management function in other wireless network. Optionally, the first access management entity may provide mobility management function. For some parts which have been described in the above embodiments, the description thereof is omitted here for brevity.

Blocks 502, 504 and 506 are similar to blocks 302, 304 and 306 of FIG. 3a and blocks 302', 304' and 306' of FIG. 3b, the description thereof is omitted here for brevity. In this embodiment, the first access management entity decides that the UE is not allowed to attach or register to the network at block 506.

At block 508, the first access management entity sends a registration reject or an attach reject or a TAU reject to the UE during a registration procedure or an attach procedure or a TAU procedure. In an embodiment, the registration procedure or the attach procedure or the TAU procedure may be similar to the registration procedure or the attach procedure or the TAU procedure as defined in various communication protocol specifications such as 3GPP TS 29.502 V16.0.0 or 3GPP TS 23.402 V16.0.0.

Figure 6:
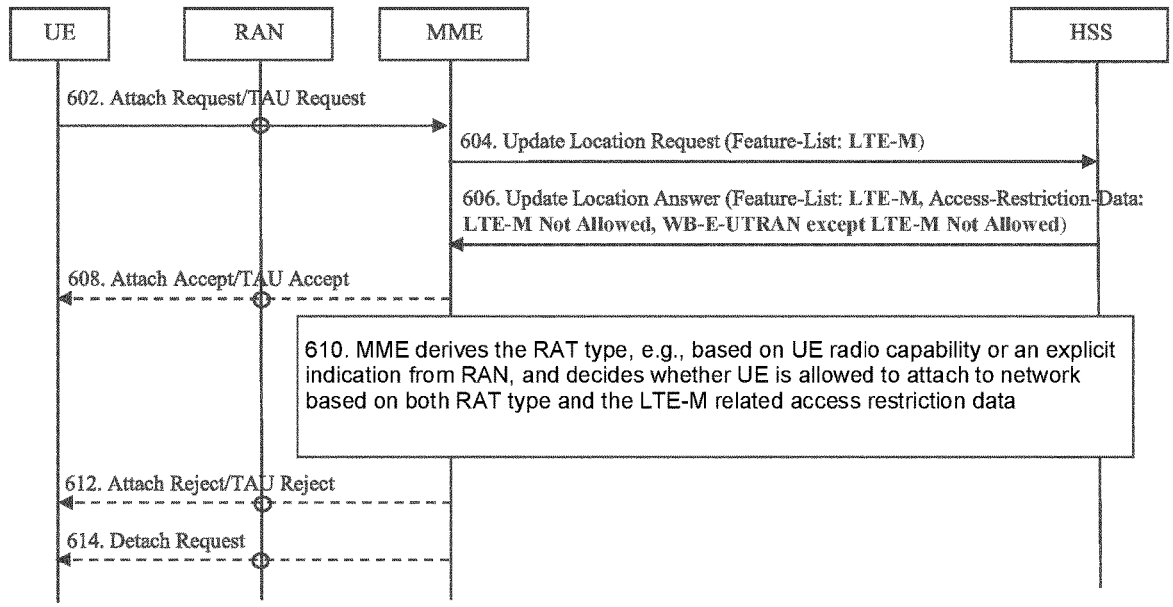
FIG. 6 shows a flowchart of LTE-M access restriction data handling by HSS and MME during an attach or TAU procedure according to an embodiment of the present disclosure.

FIG. 6 shows a flowchart of LTE-M access restriction data handling by HSS and MME during an attach or TAU procedure according to an embodiment of the present disclosure. For some parts which have been described in the above embodiments, the description thereof is omitted here for brevity.

At step 602, UE may initiate an attach procedure or a TAU procedure by sending an attach request or a TAU request to MME. The MME may receive the attach request or the TAU request from the UE.

At step 604, MME may send a Update Location Request to HSS and HSS receives the Update Location Request. In the Feature-List AVP in the Update Location Request, LTE-M bit may be set which indicates MME supports LTE-M related restriction.

At step 606, HSS may send a Update Location Answer to MME and MME receives the Update Location Answer from HSS. The update location answer may include the access restriction or RAT restriction data associated with the UE. For example, in the Feature-List AVP of the Update Location Answer, LTE-M bit may be set which indicates HSS supports LTE-M related restriction. HSS may also set the "LTE-M Not Allowed" and/or "WB-E-UTRAN except LTE-M Not Allowed" bits of Access-Restriction-Data AVP accordingly.

At step 608, MME may send a Attach Accept or TAU Accept to UE before step 610 is performed. This step may happen when MME derive the RAT type currently used by the UE in a later phase, e.g., when UE radio capability information is received in a later phase.

At step 610, MME may derive the RAT type currently used by the UE, e.g., based on UE radio capability or an explicit indication from RAN, and decides whether the UE is allowed to attach to the network based on the RAT type currently used by the UE and the Access-Restriction-Data. If LTE-M is indicated as restriction in the Access-Restriction-Data while the RAT type currently used by the UE is LTE-M, then the UE is not allowed to attach to the network. If WB-E-UTRAN except LTE-M is indicated as restriction in the Access-Restriction-Data while the RAT type is WB-E-UTRAN, the UE is not allowed to attach to network. Otherwise, the UE is not restricted to attach to network by the LTE-M related access restriction data.

At step 612, if the UE is not allowed to attach to network, then when step 608 is already performed, MME may trigger a detach procedure by sending a Detach Request to the UE.

At step 614, if the UE is not allowed to attach to network, then when step 608 is not performed, MME may reject the Attach Request or TAU Request by sending an Attach Reject or TAU Reject to UE.

Figure 7:
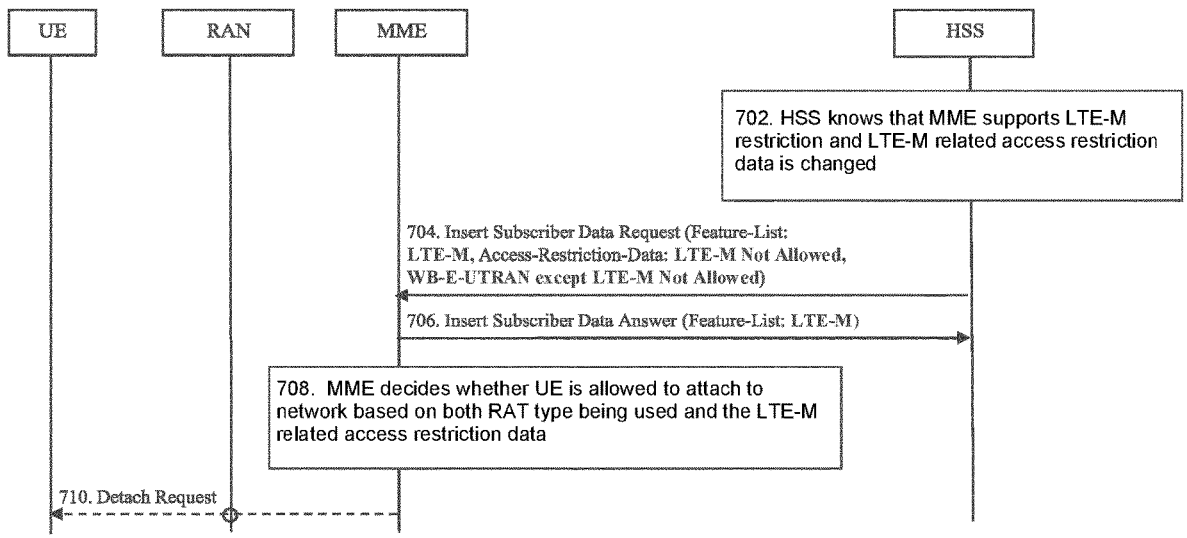
FIG. 7 shows a flowchart of LTE-M access restriction data update procedure according to an embodiment of the present disclosure.

FIG. 7 shows a flowchart of LTE-M access restriction data update procedure according to an embodiment of the present disclosure. For some parts which have been described in the above embodiments, the description thereof is omitted here for brevity.

At step 702, HSS may know that MME supports LTE-M (e.g., from the Update Location Request) and LTE-M related access restriction data is changed.

At step 704, HSS may send Insert Subscriber Data Request to MME and MME receives the Insert Subscriber Data Request from HSS. The insert subscriber data request may include the access restriction or RAT restriction data associated with the UE. For example, in the Insert Subscriber Data Request, LTE-M bit may be set in the Feature-List AVP, which indicates HSS supports LTE-M related restriction. HSS may set the "LTE-M Not Allowed" and/or "WB-E-UTRAN except LTE-M Not Allowed" bits of Access-Restriction-Data AVP accordingly.

At step 706, MME may send Insert Subscriber Data Answer to HSS and HSS may receive Insert Subscriber Data Answer. In the Insert Subscriber Data Answer, LTE-M bit may be set in the Feature-List AVP, which indicates MME supports LTE-M related restriction.

At step 708, MME may decide whether the UE is allowed to attach to the network based on the RAT type currently used by the UE and the LTE-M related access restriction data.

Step 708 is same as step 610 of FIG. 6.

At step 710, when MME may decide that the UE is not allowed to attach to the network, MME initiates a detach procedure by sending a Detach Request to UE.

Figure 8:
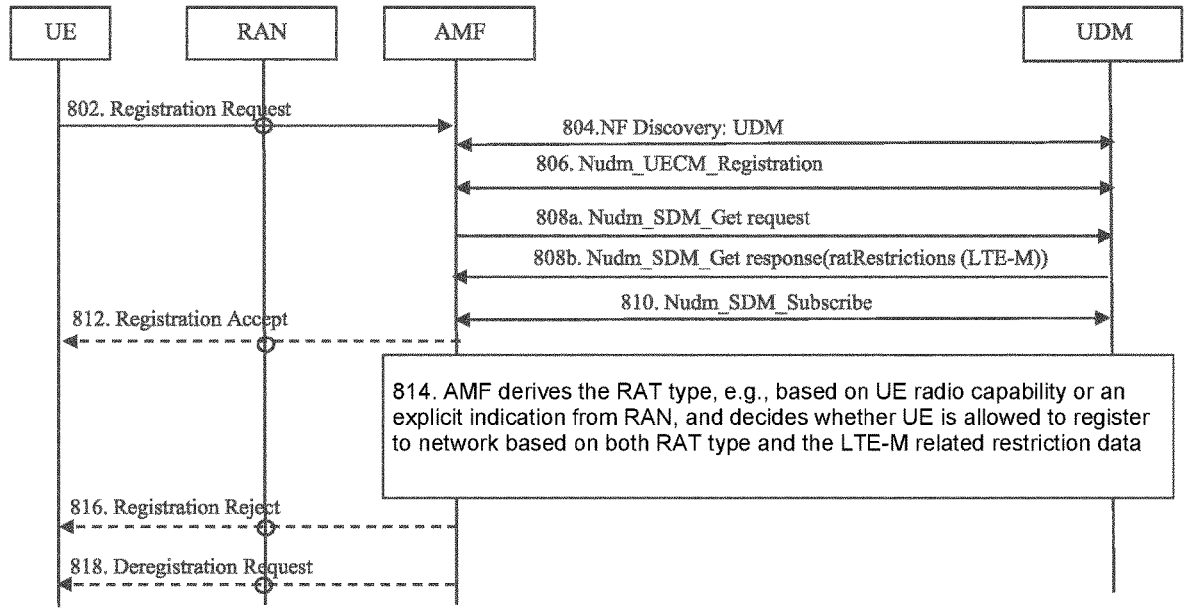
FIG. 8 shows a flowchart of LTE-M restriction data handling by UDM and AMF during a registration procedure according to an embodiment of the present disclosure.

FIG. 8 shows a flowchart of LTE-M restriction data handling by UDM and AMF during a registration procedure according to an embodiment of the present disclosure. For some parts which have been described in the above embodiments, the description thereof is omitted here for brevity.

At step 802, UE may initiate a registration procedure by sending a Registration Request to AMF and AMF may receive the Registration Request from the UE.

At step 804, AMF may discover the UDM by using a NF Discovery service operation.

At step 806, AMF may trigger Nudm_UECM_Registration service operation and UDM may store related UE Context Management information in UDM.

At step 808a, AMF may send Nudm_SDM_Get request to the UDM and UDM may send a Nudm_SDM_get response including the access restriction or RAT restriction data associated with the UE to the AMF at step 808b. Then AMF may retrieve the UE's subscription data from UDM including a Restricted RAT list. The Restricted RAT list may include LTE-M related access restriction data.

At step 810, AMF may send a request to UDM to subscribe to a notification of the UE's individual data change such as LTE-M related access restriction data change.

At step 812, AMF may send Registration Accept to UE before step 814 is performed. Step 812 may happen when AMF can derive the RAT type currently used by the UE in a later phase, e.g., when UE radio capability information is received in a later phase.

At step 814, AMF may derive the RAT type currently used by the UE, e.g., based on UE radio capability or an explicit indication from RAN, and decides whether the UE is allowed to register to the network based on the RAT type currently used by the UE and the LTE-M related restriction data. If LTE-M is indicated as restriction in the LTE-M related restriction data while the RAT type is LTE-M, the UE is not allowed to attach to the network. Otherwise, the UE is not restricted to attach to the network by the LTE-M related access restriction data.

At step 816, if the UE is not allowed to attach to network, then if step 812 is already performed, AMF may trigger a deregistration procedure by sending a Deregistration Request to the UE.

At step 818, if the UE is not allowed to attach to network, then if step 812 is not performed, AMF may reject the Registration Request by sending a Registration Reject to the UE.

Figure 9:
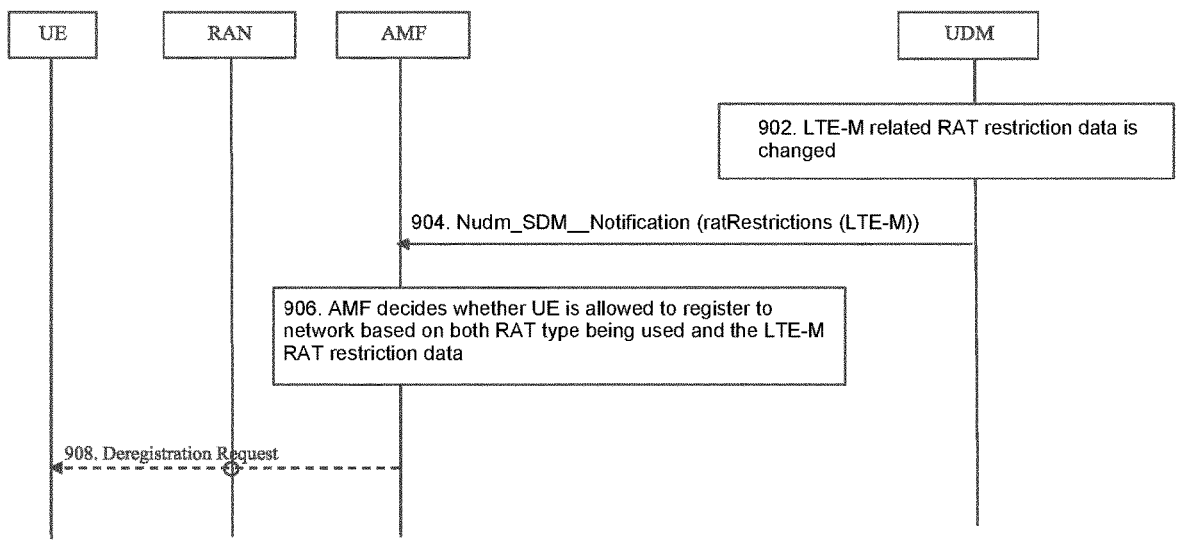
FIG. 9 shows a flowchart of LTE-M RAT restriction data update procedure in 5GC according to an embodiment of the present disclosure.

FIG. 9 shows a flowchart of LTE-M RAT restriction data update procedure in 5GC (5G Core Network) according to an embodiment of the present disclosure. For some parts which have been described in the above embodiments, the description thereof is omitted here for brevity.

At step 902, UDM determines that LTE-M related RAT restriction data is changed in UDM.

At step 904, UDM may notify AMF the changed LTE-M RAT restriction data by sending an Nudm_SDM_Notification including the access restriction or RAT restriction data associated with the UE to the AMF. Then AMF may receive an Nudm_SDM_Notification including the access restriction or RAT restriction data associated with the UE from the UDM.

At step 906, AMF may decide whether the UE is allowed to register to the network based on the RAT type currently used by the UE and LTE-M restriction data from UDM.

At step 908, when AMF decides that the UE is not allowed to register to the network, AMF may initiate a deregistration procedure by sending a Deregistration Request to the UE.

Figure 10:
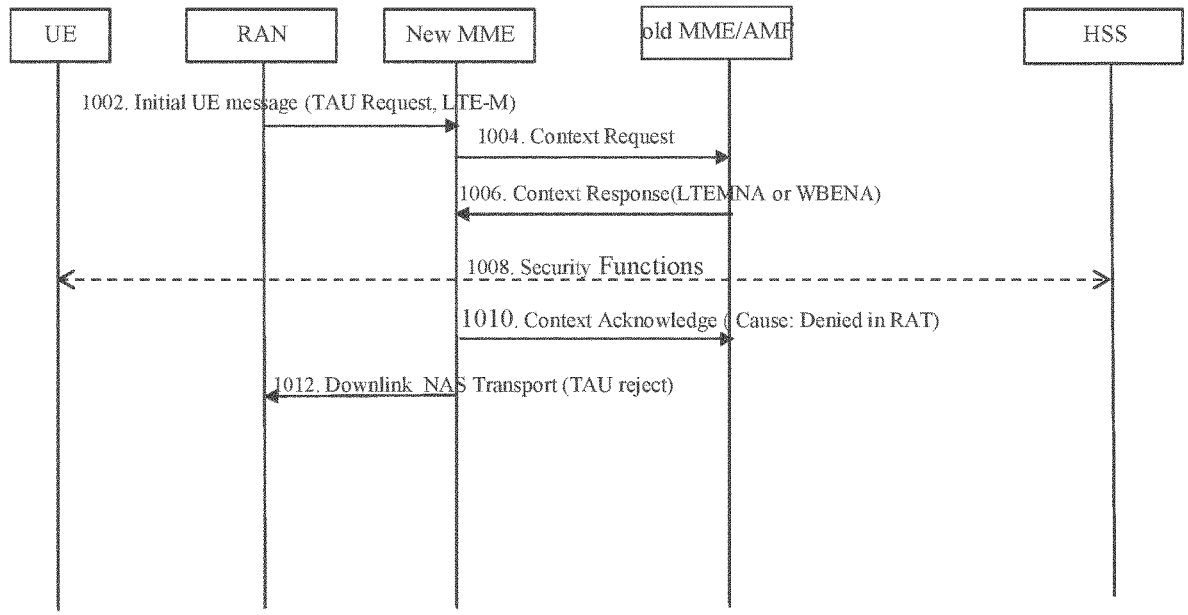
FIG. 10 shows a flowchart of a mobility procedure with LTE-M access restriction data transfer according to an embodiment of the present disclosure.

FIG. 10 shows a flowchart of a mobility procedure with LTE-M access restriction data transfer according to an embodiment of the present disclosure. For some parts which have been described in the above embodiments, the description thereof is omitted here for brevity.

At step 1002, a new MME receives a TAU Request from the UE. The TAU Request together with LTE-M indication may be included in an Initial UE message sent from a RAN node.

At step 1004, the new MME may send a Context Request an old MME or AMF to get the UE Context.

At step 1006, the new MME may receive a Context Response including the access restriction or RAT restriction data associated with the UE from the old MME or the old AMF. For example, extended Access Restriction data in MM Context may be set to "LTEMA" or "WBENA" based on the subscription data related to the UE.

At step 1008, security related function can be done if necessary.

At step 1010, the new MME may send Context Acknowledge with cause "Denied in RAT" to the old MME/AMF, if LTEMNA is set in Extended Access Restriction Data and the RAT type currently used by the UE is LTE-M or if WBENA is set in Extended Access Restriction Data and the RAT type currently used by the UE is WB-E-UTRAN.

At step 1012, the new MME may send TAU reject to the UE via RAN, if the access restriction takes effect in step 1010.

Figure 11:
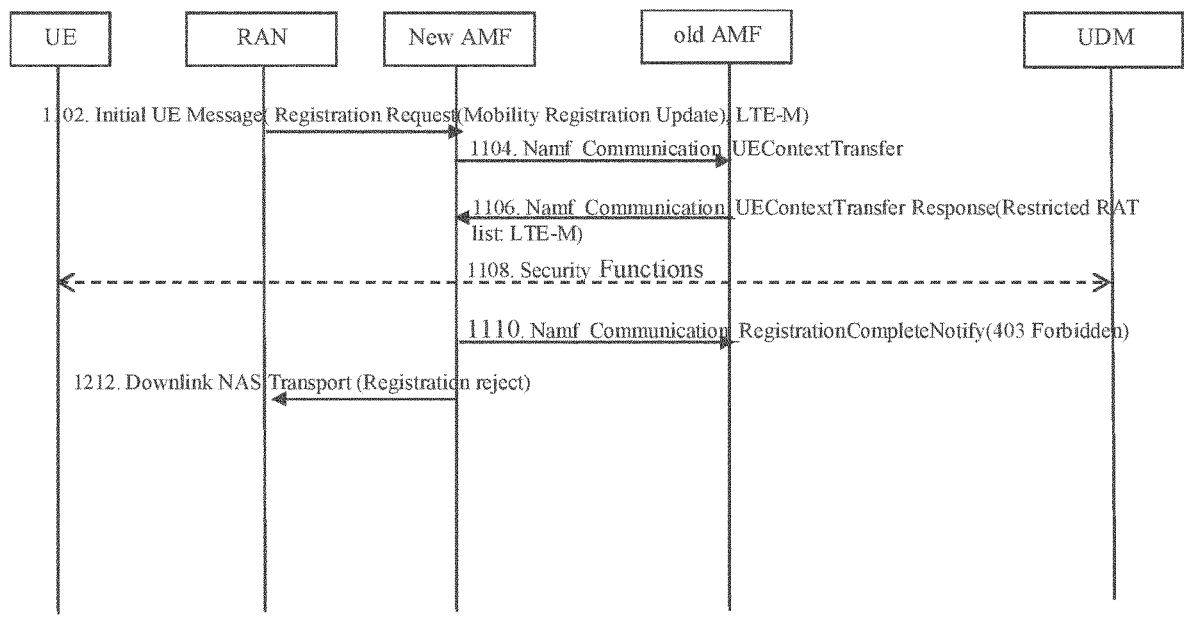
FIG. 11 shows a flowchart of Mobility Registration Update procedure with LTE-M access restriction data transfer according to an embodiment of the present disclosure.

FIG. 11 shows a flowchart of Mobility Registration Update procedure with LTE-M access restriction data transfer according to an embodiment of the present disclosure. For some parts which have been described in the above embodiments, the description thereof is omitted here for brevity.

At step 1102, a new AMF receives a Registration Request from the UE. The Registration Request (such as Mobility Registration Update) together with LTE-M indication may be included in an Initial UE message sent from a RAN node.

At step 1104, the new AMF may send an Namf_Communication_UEContextTransfer request to an old AMF to get the UE Context.

At step 1106, the new AMF may receive an Namf_Communication_UEContextTransfer Response including the access restriction or RAT restriction data associated with the UE from the old AMF. For example, Restricted RAT list included in the Namf_Communication_UEContextTransfer Response may include LTE-M related RAT restriction data.

At step 1108, security related function can be done if necessary.

At step 1110, the new AMF may sends a Namf_Communication_RegistrationCompleteNotify to the old AMF with problem details "403 Forbidden", if LTE-M is indicated as restriction in the Restricted RAT list and the RAT type currently used by the UE is LTE-M or if EUTRA is indicated as restriction in the Restricted RAT list and the RAT type currently used by the UE is EUTRA.

At step 1112, Registration reject may be sent to the UE, if access restriction takes effect in step 1110.

Figure 12:
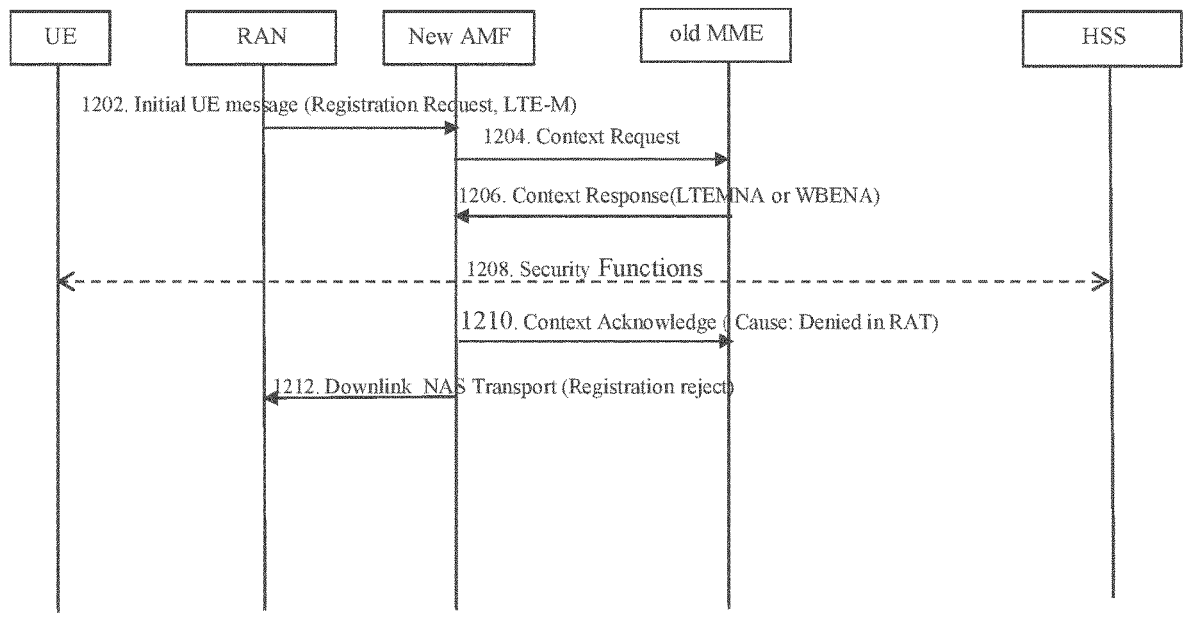
FIG. 12 shows a flowchart of Inter system Mobility Registration Update procedure from MME to AMF with LTE-M access restriction data transfer according to an embodiment of the present disclosure.

FIG. 12 shows a flowchart of Inter system Mobility Registration Update procedure from MME to AMF with LTE-M access restriction data transfer according to an embodiment of the present disclosure. For some parts which have been described in the above embodiments, the description thereof is omitted here for brevity.

At step 1202, a new AMF receives a Registration Request from the UE. For example, the Registration Request together with LTE-M indication may be included in an Initial UE message sent from a RAN node.

At step 1204, the new AMF may send a Context Request to an old MME to get the UE Context.

At step 1206, the new AMF may receive a Context Response including the access restriction or RAT restriction data associated with the UE from old MME. For example, Extended Access Restriction data in MM Context could be set to "LTEMA" or "WBENA" based on subscription data related to the UE.

At step 1208, security related function can be done if necessary.

At step 1210, the new AMF may send a Context Acknowledge with cause "Denied in RAT" to the old MME, if LTEMNA is set in Extended Access Restriction Data and the RAT type currently used by the UE is LTE-M or if WBENA is set in Extended Access Restriction Data and the RAT type currently used by the UE is EUTRA.

At step 1212, the new AMF may send Registration reject to the UE via the RAN node, if access restriction takes effect in step 1210.

Some messages and procedures as shown in FIGS. 6-12 are similar to the corresponding messages and corresponding procedures as described in 3GPP TS 23.401 v16.3.0, 3GPP TS 23.502 V16.1.1, 3GPP TS23.501 V16.1.0, 3GPP TS 23.402 V16.0.0 or other 3GPP specifications, the disclosure of which is incorporated by reference herein in its entirety.

Figure 13A:
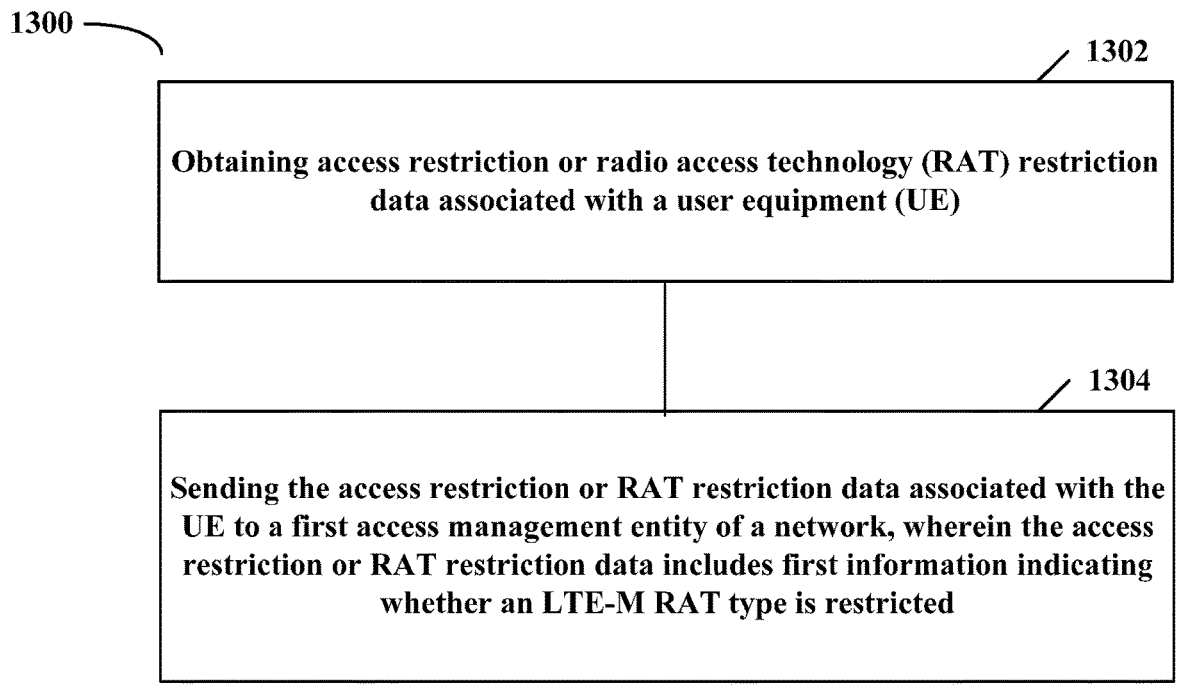
FIG. 13a shows a flowchart of a method according to another embodiment of the present disclosure.

FIG. 13a shows a flowchart of a method according to another embodiment of the present disclosure, which may be performed by an apparatus implemented in/at or communicatively coupled to a subscription data storage entity. As such, the apparatus may provide means or modules for accomplishing various parts of the method 1300 as well as means or modules for accomplishing other processes in conjunction with other components. The subscription data storage entity can be any suitable information storage device such as HSS or UDM as shown in FIGS. 1-2. For some parts which have been described in the above embodiments, the description thereof is omitted here for brevity.

At block 1302, the subscription data storage entity obtains access restriction or RAT restriction data associated with a UE. The subscription data storage entity may obtain the access restriction or RAT restriction data associated with the UE in various ways. For example, the subscription data storage entity may obtain this data during various subscriber profile management procedures for example as defined in 3GPP TS 23.502 V16.1.1 and 3GPP TS 23.402 V16.0.0. The access restriction or RAT restriction data may include first information indicating whether an LTE-M RAT type is restricted as described above.

At block 1304, the subscription data storage entity sends the access restriction or RAT restriction data associated with the UE to a first access management entity of a network. The subscription data storage entity may send the access restriction or RAT restriction data associated with the UE to the first access management entity of the network in various ways, for example, in response to a restriction data request or a subscription request from the first access management entity or a change of the restriction data.

Figure 13B:
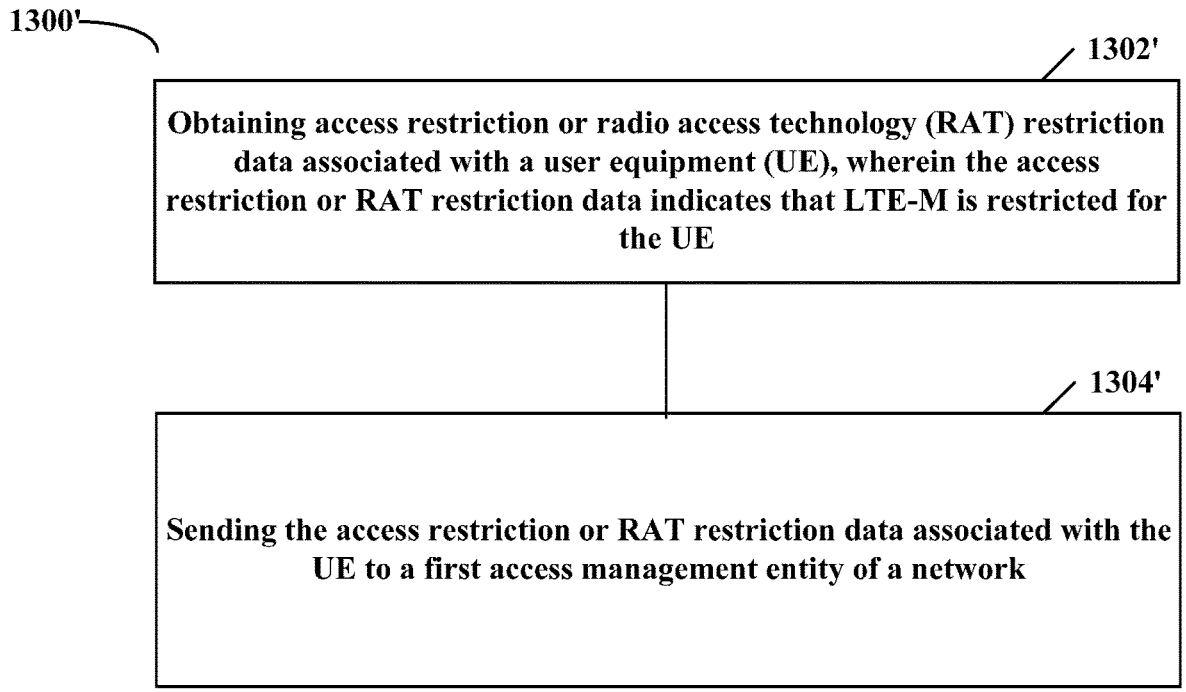
FIG. 13b shows a flowchart of a method according to another embodiment of the present disclosure.

FIG. 13b shows a flowchart of a method according to another embodiment of the present disclosure, which may be performed by an apparatus implemented in/at or communicatively coupled to a subscription data entity. As such, the apparatus may provide means or modules for accomplishing various parts of the method 1300' as well as means or modules for accomplishing other processes in conjunction with other components. The subscription data entity can be any suitable information storage device such as HSS or UDM as shown in FIGS. 1-2. For some parts which have been described in the above embodiments, the description thereof is omitted here for brevity.

At block 1302', the subscription data entity obtains access restriction or radio access technology (RAT) restriction data associated with a user equipment (UE). The access restriction or RAT restriction data indicates that LTE-M is restricted for the UE.

At block 1304', the subscription data entity sends the access restriction or RAT restriction data associated with the UE to a first access management entity of a network.

In an embodiment, when the LTE-M RAT type is indicated as restriction and the RAT type currently used by the UE is the LTE-M RAT type, the UE is not allowed to attach or register to the network.

In an embodiment, the first access management entity is a mobility management entity (MME) and the subscription data storage entity is a home subscriber server (HSS), the HSS may receive an update location request from the MME as shown in step 604 of FIG. 6 and sending an update location answer including the access restriction or RAT restriction data associated with the UE to the MME as shown in step 606 of FIG. 6.

In an embodiment, the update location request may include information indicating that the MME supports restriction related to the LTE-M RAT type and the update location answer may include information indicating that the HSS supports restriction related to the LTE-M RAT type.

In an embodiment, the first access management entity is a mobility management entity (MME) and the subscription data storage entity is a home subscriber server (HSS), the HSS may determine a change of the restriction related to the LTE-M RAT type as shown in step 702 of FIG. 7; and send an insert subscriber data request including the access restriction or RAT restriction data associated with the UE to the MME as shown in step 704 of FIG. 7.

In an embodiment, the insert subscriber data request may include information indicating that the HSS supports restriction related to the LTE-M RAT type and the insert subscriber data answer may include information indicating that the MME supports restriction related to the LTE-M RAT type.

In an embodiment, the first access management entity is an access and mobility function (AMF) and the subscription data storage entity is a unified data management (UDM), the UDM may receive a Nudm_SDM_get request from AMF as shown in step 808a of FIG. 8; and send a Nudm_SDM_get response including the access restriction or RAT restriction data associated with the UE to the AMF as shown in step 808b of FIG. 8.

In an embodiment, the first access management entity is an access and mobility function (AMF) and the subscription data storage entity is a unified data management (UDM), the UDM may determine a change of the restriction related to the LTE-M RAT type as shown in step 902 of FIG. 9; and send an Nudm_SDM_Notification including the access restriction or RAT restriction data associated with the UE to the AMF as shown in step 904 of FIG. 9.

In an embodiment, the access restriction or RAT restriction data may further include second information indicating whether a WB-E-UTRAN RAT type excludes the LTE-M RAT is restricted.

In an embodiment, the first information may be a bit and the second information may be a bit.

Figure 14A:
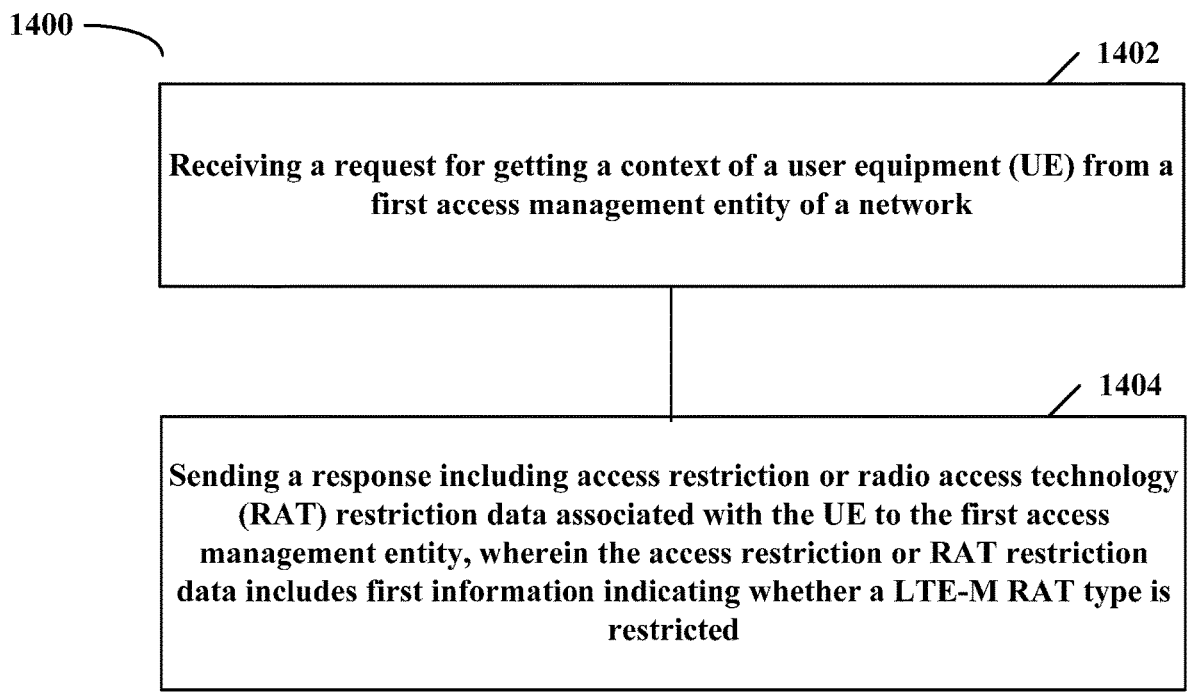
FIG. 14a shows a flowchart of a method according to another embodiment of the present disclosure.

FIG. 14a shows a flowchart of a method according to another embodiment of the present disclosure, which may be performed by an apparatus implemented in/at or communicatively coupled to a second access management entity. As such, the apparatus may provide means or modules for accomplishing various parts of the method 1400 as well as means or modules for accomplishing other processes in conjunction with other components. The subscription data storage entity can be any suitable access management entity such as AMF or MME as shown in FIGS. 1-2. For some parts which have been described in the above embodiments, the description thereof is omitted here for brevity.

At block 1402, the second access management entity may receive a request for getting a context of a UE from a first access management entity of a network. For example, the old MME or AMF may receive the request for getting the context of the UE from the first access management entity of the network such as new MME or AMF as shows in FIGS. 10-12.

At block 1404, the second access management entity may send a response including access restriction or radio access technology (RAT) restriction data associated with the UE to the first access management entity. For example, the old MME or AMF may send the response including access restriction or radio access technology (RAT) restriction data associated with the UE to the first access management entity such as new MME or AMF as shows in FIGS. 10-12. In an embodiment, the access restriction or RAT restriction data may include first information indicating whether a LTE-M RAT type is restricted.

Figure 14B:
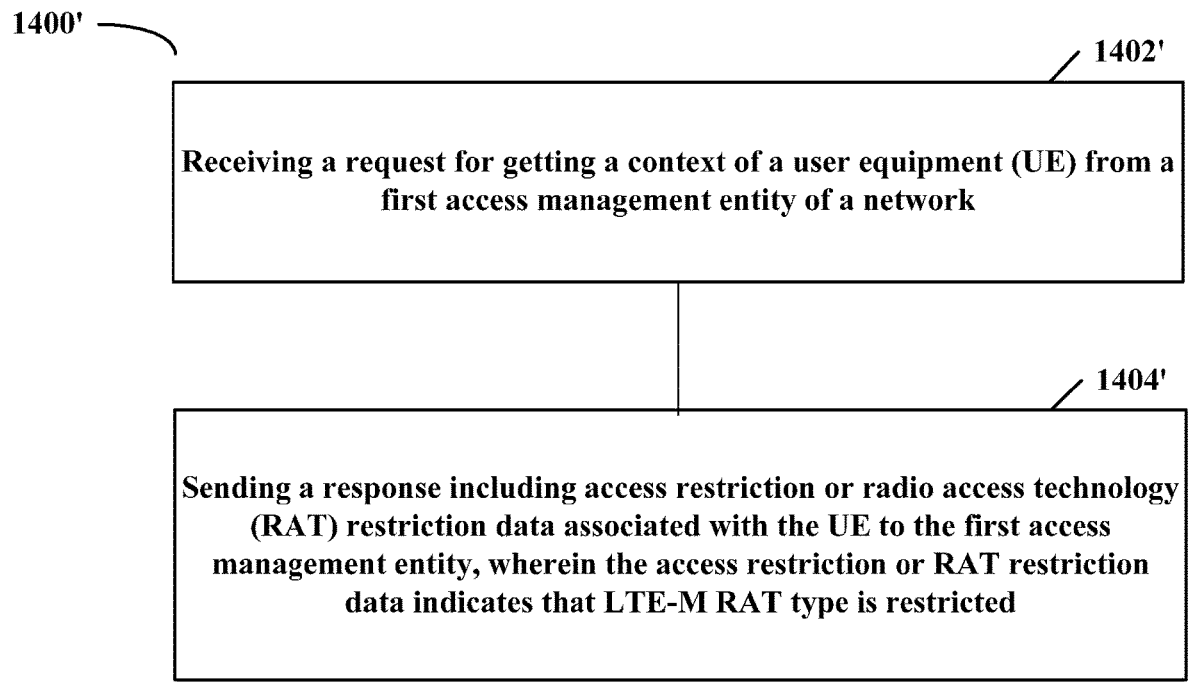
FIG. 14b shows a flowchart of a method according to another embodiment of the present disclosure.

FIG. 14b shows a flowchart of a method according to another embodiment of the present disclosure, which may be performed by an apparatus implemented in/at or communicatively coupled to a second access management entity. As such, the apparatus may provide means or modules for accomplishing various parts of the method 1400' as well as means or modules for accomplishing other processes in conjunction with other components. The subscription data storage entity can be any suitable access management entity such as AMF or MME as shown in FIGS. 1-2. For some parts which have been described in the above embodiments, the description thereof is omitted here for brevity.

At block 1402', the second access management entity may receive a request for getting a context of a UE from a first access management entity of a network.

At block 1404', the second access management entity may send a response including access restriction or radio access technology (RAT) restriction data associated with the UE to the first access management entity. The access restriction or RAT restriction data may indicate that LTE-M RAT type is restricted.

In an embodiment, the first access management entity is a new mobility management entity (MME) and the second access management entity is an old MME or an old access and mobility function (AMF), the request is a context request and the response is a context response.

In an embodiment, the first access management entity is a new access and mobility function (AMF) and the second access management entity is an old access and mobility function (AMF), the request is an Namf_Communication_UEContextTransfer request and the response is an Namf_Communication_UEContextTransfer response.

In an embodiment, the first access management entity is a new access and mobility function (AMF) and the second access management entity is an old mobility management entity (MME), the request is a context request and the response is a context response.

In an embodiment, the access restriction or RAT restriction data may further include second information indicating whether a WB-E-UTRAN RAT type excludes the LTE-M RAT is restricted. In an embodiment, the first information may be a bit and the second information may be a bit.

Figure 15:
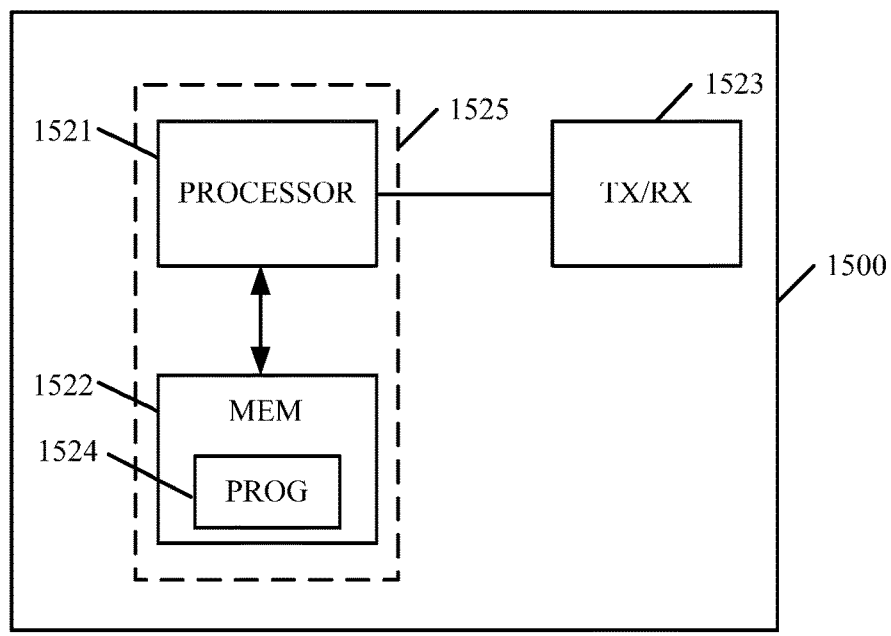
FIG. 15 is a block diagram showing an apparatus suitable for use in practicing some embodiments of the disclosure.

FIG. 15 is a block diagram showing an apparatus suitable for use in practicing some embodiments of the disclosure. For example, any one of the first access management entity (such as AMF or MME) or the second access management entity (such as AMF or MME) or the subscription data entity (such as HSS or UDM) as described above may be implemented through the apparatus 1500.

The apparatus 1500 comprises at least one processor 1521, such as a DP, and at least one MEM 1522 coupled to the processor 1521. The apparatus 1520 may further comprise a transmitter TX and receiver RX 1523 coupled to the processor 1521. The MEM 1522 stores a PROG 1524. The PROG 1524 may include instructions that, when executed on the associated processor 1521, enable the apparatus 1520 to operate in accordance with the embodiments of the present disclosure. A combination of the at least one processor 1521 and the at least one MEM 1522 may form processing means 1525 adapted to implement various embodiments of the present disclosure.

Various embodiments of the present disclosure may be implemented by computer program executable by one or more of the processor 1521, software, firmware, hardware or in a combination thereof.

The MEM 1522 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1521 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the first access management entity (such as AMF or MME), the memory 1522 contains instructions executable by the processor 1521, whereby the first access management entity operates according to any of the methods related to the first access management entity as described above.

In an embodiment where the apparatus is implemented as or at the second access management entity (such as AMF or MME), the memory 1522 contains instructions executable by the processor 1521, whereby the second access management entity operates according to any of the methods related to the second access management entity as described above.

In an embodiment where the apparatus is implemented as or at the subscription data entity, the memory 1522 contains instructions executable by the processor 1521, whereby the subscription data entity operates according to any of the methods related to the subscription data entity as described above.

Figure 16A:
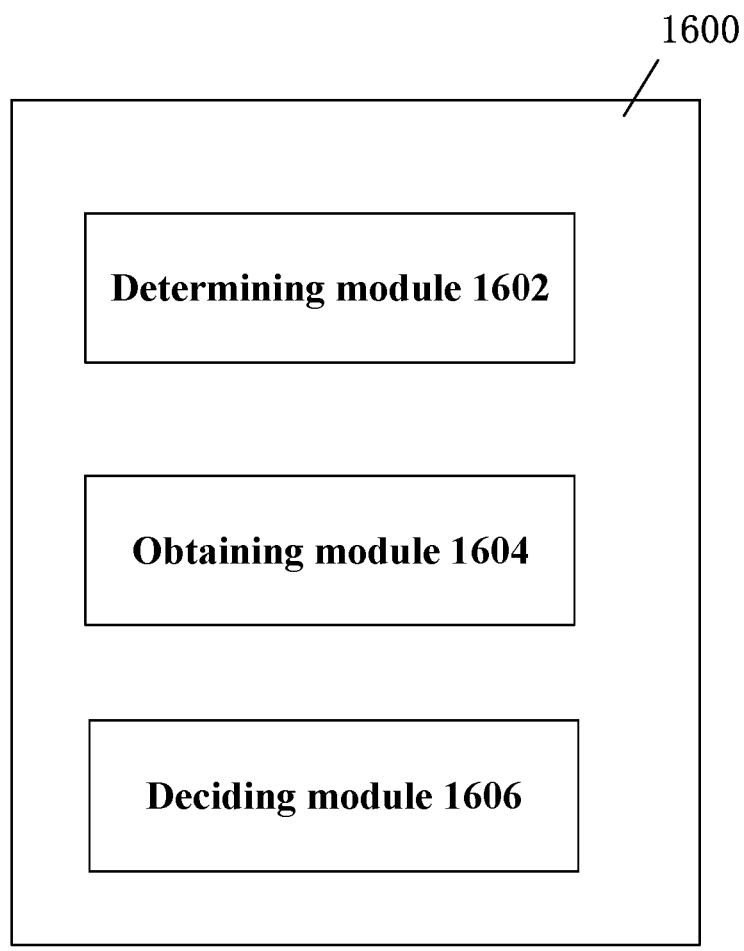
FIG. 16a is a block diagram showing a first access management entity of a network according to an embodiment of the disclosure.

FIG. 16a is a block diagram showing a first access management entity of a network according to an embodiment of the disclosure. As shown, the first access management entity 1600 comprises a determining module 1602, an obtaining module 1604 and a deciding module 1606. The determining module 1602 may be configured to determine a radio access technology (RAT) type currently used by a user equipment (UE). The obtaining module 1604 may be configured to obtain access restriction or RAT restriction data associated with the UE. The access restriction or RAT restriction data may include first information indicating whether an LTE-M RAT type is restricted. The deciding module 1606 may be configured to decide whether the UE is allowed to attach or register to the network based on the RAT type currently used by the UE and the access restriction or RAT restriction data associated with the UE.

Figure 16B:
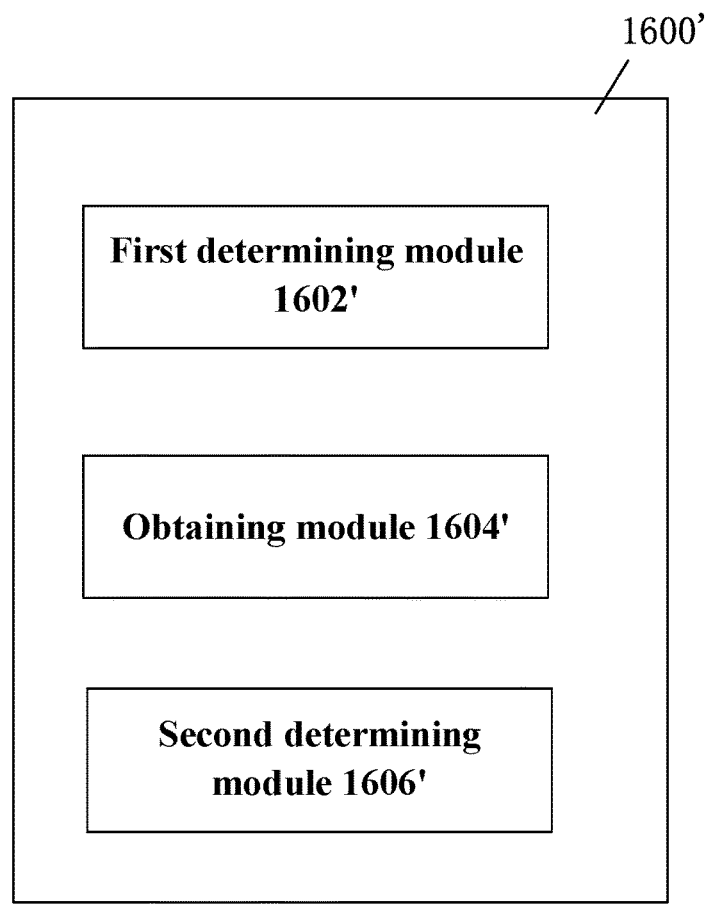
FIG. 16b is a block diagram showing a first access management entity of a network according to another embodiment of the disclosure.

FIG. 16b is a block diagram showing a first access management entity of a network according to another embodiment of the disclosure. As shown, the first access management entity 1600' comprises a first determining module 1602', an obtaining module 1604' and a second determining module 1606'. The first determining module 1602' may be configured to determine that a user equipment (UE) is using LTE-M radio access technology (RAT). The obtaining module 1604' may be configured to obtain access restriction or RAT restriction data associated with the UE, wherein the access restriction or RAT restriction data indicates that LTE-M RAT type is restricted. The second determining module 1606' may be configured to determine whether the UE using LTE-M is allowed to attach or register to the network based on the obtained access restriction or RAT restriction data associated with the UE.

Figure 17:
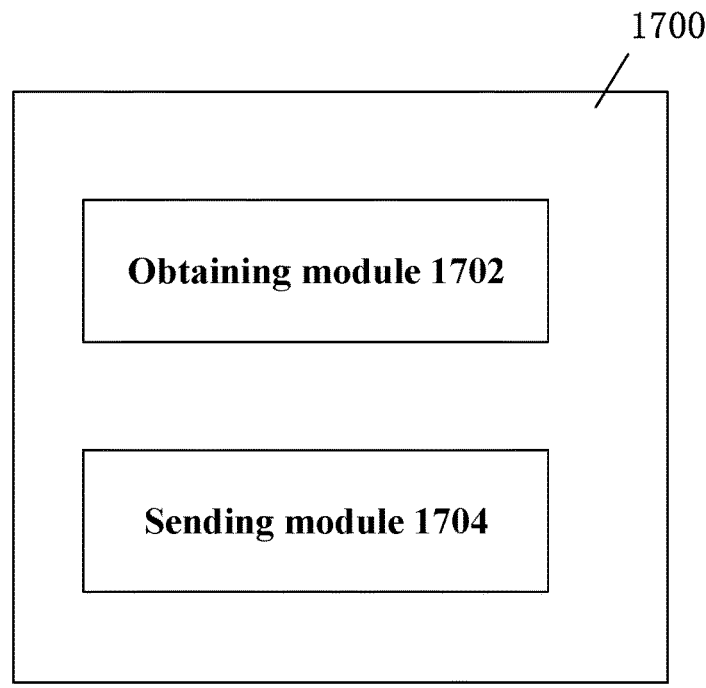
FIG. 17 is a block diagram showing a subscription data storage entity according to an embodiment of the disclosure.

FIG. 17a is a block diagram showing a subscription data storage entity according to an embodiment of the disclosure. As shown, the subscription data storage entity 1700 comprises an obtaining module 1702 and a sending module 1704. In another embodiment, the obtaining module 1702 may be configured to obtain access restriction or radio access technology (RAT) restriction data associated with a user equipment (UE). The sending module 1704 may be configured to send the access restriction or RAT restriction data associated with the UE to a first access management entity of a network. The access restriction or RAT restriction data may include first information indicating whether an LTE-M RAT type is restricted.

In another embodiment, the obtaining module 1702 may be configured to obtain access restriction or radio access technology (RAT) restriction data associated with a user equipment (UE), wherein the access restriction or RAT restriction data indicates that LTE-M is restricted for the UE. The sending module 1704 may be configured to send the access restriction or RAT restriction data associated with the UE to a first access management entity of a network.

Figure 18:
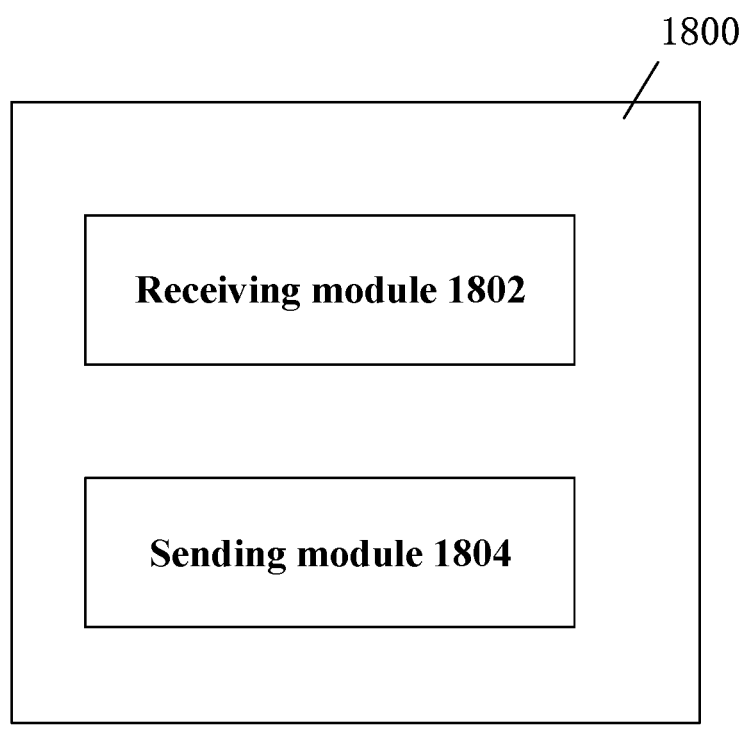
FIG. 18 is a block diagram showing a second access management entity according to an embodiment of the disclosure.

FIG. 18 is a block diagram showing a second access management entity according to an embodiment of the disclosure. As shown, the second access management entity 1800 comprises a receiving module 1802 and a sending module 1804. The receiving module 1802 may be configured to receive a request for getting a context of a user equipment (UE) from a first access management entity of a network. The sending module 1804 may be configured to send a response including access restriction or radio access technology (RAT) restriction data associated with the UE to the first access management entity. In an embodiment, the access restriction or RAT restriction data may include first information indicating whether an LTE-M RAT type is restricted. In another embodiment, the access restriction or RAT restriction data may include first information indicating whether an LTE-M RAT type is restricted.

According to an aspect of the disclosure it is provided a computer program product being tangibly stored on a computer readable storage medium and including instructions which, when executed on at least one processor, cause the at least one processor to carry out any of the methods related to the first access management entity as described above.

According to an aspect of the disclosure it is provided a computer program product being tangibly stored on a computer readable storage medium and including instructions which, when executed on at least one processor, cause the at least one processor to carry out any of the methods related to the second access management entity as described above.

According to an aspect of the disclosure it is provided a computer program product being tangibly stored on a computer readable storage medium and including instructions which, when executed on at least one processor, cause the at least one processor to carry out any of the methods related to the subscription data storage entity or the subscription data entity as described above.

According to an aspect of the disclosure it is provided a computer-readable storage medium storing instructions which when executed by at least one processor, cause the at least one processor to carry out any of the methods related to the first access management entity as described above.

According to an aspect of the disclosure it is provided a computer-readable storage medium storing instructions which when executed by at least one processor, cause the at least one processor to carry out any of the methods related to the second access management entity as described above.

According to an aspect of the disclosure it is provided a computer-readable storage medium storing instructions which when executed by at least one processor, cause the at least one processor to carry out any of the methods related to the subscription data storage entity or the subscription data entity as described above.

Embodiments herein afford many advantages, of which a non-exhaustive list of examples follows. Some embodiments herein may provide the flexibility for operator to define its access restriction rule more accurately, especially for LTE-M, which can enable the operator to exactly control the usage of LTE-M and to provide a simple billing policy (e.g., a data plan per month with fixed price) for CAT-M subscription without complicating the charging logic. The embodiments herein are not limited to the features and advantages mentioned above. A person skilled in the art will recognize additional features and advantages upon reading the following detailed description.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first access management entity of a network, comprising:
    determining whether a user equipment (UE) is using LTE-M radio access technology (RAT);
    obtaining access restriction or RAT restriction data associated with the UE, wherein the access restriction or RAT restriction data includes first information indicating whether the UE is allowed to use the LTE-M RAT type and second information indicating whether the UE is allowed to use a WB-E-UTRAN RAT type other than the LTE-M RAT type; and
    determining whether the UE is allowed to attach or register to the network based on the obtained access restriction or RAT restriction data associated with the UE;
    wherein the access restriction or RAT restriction data indicating whether the UE is allowed to use the LTE-M RAT type is a second bit and the access restriction or RAT restriction data indicating whether the UE is allowed to use a WB-E-UTRAN RAT type other than the LTE-M RAT is a third bit, and wherein the second bit and the third bit are only used when a first bit for indicating whether the WB-E-UTRAN RAT type is not allowed is not set.

2. The method of claim 1, wherein when the first information indicates that the UE is not allowed to use the LTE-M RAT type, the UE using LTE-M is not allowed to attach or register to the network.

3. The method of claim 1, wherein when the UE is not allowed to attach or register to the network, the method further comprises:
    sending a deregistration request or a detach request to the UE when UE has registered or attached to the network; or
    sending a registration reject or an attach reject or a tracking area update (TAU) reject to the UE during a registration procedure or an attach procedure or a TAU procedure.

4. The method of claim 1, wherein the access restriction or RAT restriction data is obtained from at least one of a subscription data entity of the network;
    a second access management entity of the network; or
    a second access management entity of another network.

5. The method of claim 1, wherein the first access management entity is a mobility management entity (MME), the method further comprising:
    receiving an attach request or a tracking area update (TAU) request from a UE;
    sending an update location request to a home subscriber server (HSS); and
    receiving an update location answer from the HSS, wherein the update location answer includes the access restriction or RAT restriction data associated with the UE.

6. The method of claim 1, wherein the first access management entity is a mobility management entity (MME), the method further comprising:
    receiving an insert subscriber data request from a home subscriber server (HSS); and
    sending an insert subscriber data answer to the HSS, wherein the insert subscriber data request includes the access restriction or RAT restriction data associated with the UE.

7. The method of claim 1, wherein the first access management entity is an access and mobility function (AMF), the method further comprising:
    receiving a registration request from the UE;
    sending a Nudm_SDM_get request to a unified data management (UDM); and
    receiving a Nudm_SDM_get response including the access restriction or RAT restriction data associated with the UE from the UDM.

8. The method of claim 1, wherein the first access management entity is an access and mobility function (AMF), the method further comprising:
    receiving an Nudm_SDM_Notification including the access restriction or RAT restriction data associated with the UE from a unified data management (UDM).

9. The method of claim 1, wherein the first access management entity is a new access and mobility function (AMF), the method further comprising:
    receiving a registration request from the UE;
    sending an Namf_Communication_UEContextTransfer request for getting a UE context for the UE context to an old AMF; and
    receiving an Namf_Communication_UEContextTransfer response including the access restriction or RAT restriction data associated with the UE from the old AMF.

10. A method performed by a subscription data entity, comprising:
    obtaining access restriction or radio access technology (RAT) restriction data associated with a user equipment (UE), wherein the access restriction or RAT restriction data includes first information indicating whether the UE is allowed to use an LTE-M RAT type and second information indicating whether the UE is allowed to use a WB-E-UTRAN RAT type other than the LTE-M RAT type; and
    sending the access restriction or RAT restriction data associated with the UE to a first access management entity of a network;
    wherein the access restriction or RAT restriction data indicating whether the UE is allowed to use the LTE-M RAT type is a second bit and the access restriction or RAT restriction data indicating whether the UE is allowed to use a WB-E-UTRAN RAT type other than the LTE-M RAT is restricted is a third bit, and wherein the second bit and the third bit are only used when a first bit for indicating whether the WB-E-UTRAN RAT type is not allowed is not set.

11. The method of claim 10, wherein when the first information indicates that the UE is not allowed to use the LTE-M RAT type, the UE using LTE-M is not allowed to attach or register to the network.

12. The method of claim 10, wherein the first access management entity is a mobility management entity (MME)

and the subscription data entity is a home subscriber server (HSS), the method further comprising:
receiving an update location request from the MME; and
sending an update location answer including the access restriction or RAT restriction data associated with the UE to the MME.

13. The method of claim 12, wherein the update location request includes information indicating that the MME supports restriction related to the LTE-M RAT type and the update location answer includes information indicating that the HSS supports restriction related to the LTE-M RAT type.

14. The method of claim 10, wherein the first access management entity is a mobility management entity (MME) and the subscription data entity is a home subscriber server (HSS), the method further comprising:
determining a change of the restriction related to the LTE-M RAT type; and
sending an insert subscriber data request including the access restriction or RAT restriction data associated with the UE to the MME.

15. The method of claim 14, wherein the insert subscriber data request includes information indicating that the HSS supports restriction related to the LTE-M RAT type and the insert subscriber data answer includes information indicating that the MME supports restriction related to the LTE-M RAT type.

16. The method of claim 10, wherein the first access management entity is an access and mobility function (AMF) and the subscription data entity is a unified data management (UDM), the method further comprising:
receiving a Nudm_SDM_get request from AMF; and
sending a Nudm_SDM_get response including the access restriction or RAT restriction data associated with the UE to the AMF.

17. The method of claim 10, wherein the first access management entity is an access and mobility function (AMF) and the subscription data entity is a unified data management (UDM), the method further comprising:
determining a change of the restriction related to the LTE-M RAT type; and
sending an Nudm_SDM_Notification including the access restriction or RAT restriction data associated with the UE to the AMF.

18. An apparatus in a first access management entity of a network, comprising:
a processor; and
a memory coupled to the processor, said memory containing instructions executable by said processor, whereby said apparatus is operative to:

determine whether a user equipment (UE) is using an LTE-M radio access technology (RAT);
obtain access restriction or RAT restriction data associated with the UE, wherein the access restriction or RAT restriction data includes first information indicating whether the UE is allowed to use the LTE-M RAT type and second information indicating whether the UE is allowed to use a WB-E-UTRAN RAT type other than the LTE-M RAT type; and
determine whether the UE is allowed to attach or register to the network based on the obtained access restriction or RAT restriction data associated with the UE;
wherein the access restriction or RAT restriction data indicating whether the UE is allowed to use the LTE-M RAT type is a second bit and the access restriction or RAT restriction data indicating whether the UE is allowed to use a WB-E-UTRAN RAT type other than the LTE-M RAT is a third bit, and wherein the second bit and the third bit are only used when a first bit for indicating whether the WB-E-UTRAN RAT type is not allowed is not set.

19. An apparatus in a subscription data entity, comprising:
a processor; and
a memory coupled to the processor, said memory containing instructions executable by said processor, whereby said apparatus is operative to:
obtain access restriction or radio access technology (RAT) restriction data associated with a user equipment (UE), wherein the access restriction or RAT restriction data includes first information indicating whether the UE is allowed to use an LTE-M RAT type and second information indicating whether the UE is allowed to use a WB-E-UTRAN RAT type other than the LTE-M RAT type; and
send the access restriction or RAT restriction data associated with the UE to a first access management entity of a network;
wherein the access restriction or RAT restriction data indicating whether the UE is allowed to use the LTE-M RAT type is a second bit and the access restriction or RAT restriction data indicating whether the UE is allowed to use a WB-E-UTRAN RAT type other than the LTE-M RAT is restricted is a third bit, and wherein the second bit and the third bit are only used when a first bit for indicating whether the WB-E-UTRAN RAT type is not allowed is not set.

* * * * *